US012067865B2

(12) United States Patent
Yang et al.

(10) Patent No.: US 12,067,865 B2
(45) Date of Patent: Aug. 20, 2024

(54) METHOD FOR OBTAINING ROAD CONDITION INFORMATION, APPARATUS THEREOF, AND STORAGE MEDIUM

(71) Applicant: TENCENT TECHNOLOGY (SHENZHEN) COMPANY LIMITED, Shenzhen (CN)

(72) Inventors: Yong Yang, Shenzhen (CN); Liguang Sun, Shenzhen (CN); Hongchao Zhao, Shenzhen (CN); Hongying Jiang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 418 days.

(21) Appl. No.: 16/601,793

(22) Filed: Oct. 15, 2019

(65) Prior Publication Data

US 2020/0043324 A1 Feb. 6, 2020

Related U.S. Application Data

(63) Continuation of application No. PCT/CN2018/111784, filed on Oct. 25, 2018.

(30) Foreign Application Priority Data

Nov. 1, 2017 (CN) .......................... 201711057258.5

(51) Int. Cl.
*G08G 1/01* (2006.01)
*G01C 21/34* (2006.01)
(Continued)

(52) U.S. Cl.
CPC ....... *G08G 1/0129* (2013.01); *G01C 21/3453* (2013.01); *G06N 5/02* (2013.01); *G08G 1/0112* (2013.01); *G08G 1/052* (2013.01)

(58) Field of Classification Search
CPC .... G08G 1/0129; G08G 1/0112; G08G 1/052; G01C 21/3453; G01C 21/3492;
(Continued)

(56) References Cited

U.S. PATENT DOCUMENTS

2008/0071465 A1* 3/2008 Chapman ............. G08G 1/0104
701/117
2011/0161261 A1 6/2011 Wu et al.
(Continued)

FOREIGN PATENT DOCUMENTS

CN 101438335 A 5/2009
CN 101488284 A 7/2009
(Continued)

OTHER PUBLICATIONS

The State Intellectual Property Office of the People's Republic of China (SIPO) Office Action 1 for for 201711057258.5 Mar. 1, 2021 16 Pages (including translation).
(Continued)

*Primary Examiner* — Tyler J Lee
*Assistant Examiner* — Daniel Tyler Reich
(74) *Attorney, Agent, or Firm* — ANOVA LAW GROUP, PLLC

(57) ABSTRACT

A method includes: obtaining a number of vehicles passing a driving road segment within a duration; determining whether the driving road segment is a sparse road segment by determining whether the number of vehicles is less than or equal to a vehicle threshold; obtaining first real-time driving data transmitted by a first vehicle the target road segment, and obtaining first driving characteristic-information of the target road segment based on the first real-time driving data; obtaining second real-time driving data transmitted by a second vehicle passing a topology road segment, and obtaining second driving characteristic-information of
(Continued)

the target road segment based on the second real-time driving data, the topology road segment being a road segment within a target range of the target road segment; and generating road-condition information of the target road based on at least the second driving characteristic-information.

15 Claims, 11 Drawing Sheets

(51) Int. Cl.
  *G06N 5/02* (2023.01)
  *G08G 1/052* (2006.01)
(58) Field of Classification Search
  CPC .......... G06N 5/02; G06N 20/20; G06N 5/003; G06Q 10/04
  See application file for complete search history.

(56) References Cited

U.S. PATENT DOCUMENTS

| | | | | |
|---|---|---|---|---|
| 2012/0072096 A1* | 3/2012 | Chapman | ......... | G08G 1/096811 701/118 |
| 2012/0086582 A1* | 4/2012 | Durekovic | ............. | G08G 1/161 340/903 |
| 2012/0089423 A1* | 4/2012 | Tamir | ..................... | G07C 5/085 705/4 |
| 2014/0160295 A1* | 6/2014 | Kyomitsu | ............ | G08G 1/0112 348/159 |
| 2015/0179068 A1* | 6/2015 | Liu | .................. | G08G 1/096816 340/905 |
| 2015/0262477 A1* | 9/2015 | Fowe | ............... | G08G 1/096716 701/118 |
| 2016/0267789 A1* | 9/2016 | Fowe | ................... | G08G 1/0116 |
| 2016/0334241 A1* | 11/2016 | Kesting | ................... | G01C 21/32 |
| 2017/0284824 A1* | 10/2017 | Korzunov | .......... | G01C 21/3694 |
| 2018/0233042 A1* | 8/2018 | Zhang | .............. | G08G 1/096791 |

FOREIGN PATENT DOCUMENTS

| | | | | |
|---|---|---|---|---|
| CN | 102346964 A | | 2/2012 | |
| CN | 103927887 A | | 7/2014 | |
| CN | 104157139 A | | 11/2014 | |
| CN | 105303838 A | | 2/2016 | |
| CN | 106327870 A | | 1/2017 | |
| CN | 107195177 A | | 9/2017 | |
| EP | 2402911 A1 * | | 1/2012 | .......... G08G 1/0133 |
| WO | 2007103180 A2 | | 9/2007 | |
| WO | 2013105288 A1 | | 7/2013 | |
| WO | 2014091982 A1 | | 6/2014 | |

OTHER PUBLICATIONS

The World Intellectual Property Organization (WIPO) International Search Report for PCT/CN2018/111784 Jan. 30, 2019 6 Pages (including translation).

* cited by examiner

METHOD FOR OBTAINING ROAD CONDITION INFORMATION, APPARATUS THEREOF, AND STORAGE MEDIUM

RELATED APPLICATION

This application is a continuation application of PCT Patent Application No. PCT/CN2018/111784, filed on Oct. 25, 2018, which claims priority to Chinese Patent Application No. 201711057258.5, filed with the Chinese Patent Office on Nov. 1, 2017, and entitled "METHOD FOR OBTAINING ROAD CONDITION INFORMATION, APPARATUS THEREOF, STORAGE MEDIUM, AND TERMINAL", content of all of which is incorporated herein by reference in its entirety.

FIELD OF THE TECHNOLOGY

This application relates to the field of Internet technologies, and in particular, to a method for obtaining road condition information, an apparatus thereof, and a storage medium.

BACKGROUND OF THE DISCLOSURE

In map services, real-time traffic information, as a basic function, not only can facilitate users to know road congestion conditions, plan travel routes to make reasonable arrangement, but also can help cities to generate traffic warnings and to adjust urban traffic systems. An accurate road condition may provide high-quality estimated time of arrival (ETS) services and route planning, saving city road resources and user time.

At present, a common real-time road condition production method is mainly calculating a real-time speed of a vehicle on each road segment by collecting GPS positioning information of the vehicle on the road, integrating speeds of multiple vehicles on a same road segment, and determining the road state based the speed. Although this method is simple and straightforward, for a short-distance road section or a sparsely-traveled road section with less vehicle data, there are problems such as unreliable calculation of traffic flow and insufficient accuracy, and may easily lead to misjudgment of the state of the road condition.

The disclosed methods and systems are directed to solve one or more problems set forth above and other problems.

SUMMARY

Embodiments of the present disclosure provide a method for obtaining road condition information, an apparatus thereof, and a storage medium, which can correct certain disadvantages of a traditional model to obtain inaccurate road conditions when data is sparse, so that the outputted road condition information is more accurate and credible and, at the same time, covers all road segments, expanding the range of traffic information.

According to one aspect of the embodiments of the present disclosure, a method is provided for obtaining road condition information by a terminal. The method include obtaining first real-time driving data transmitted by a first vehicle currently passing a target road segment, and obtaining first driving characteristic-information of the target road segment based on the first real-time driving data; obtaining second real-time driving data transmitted by a second vehicle currently passing a topology road segment, and obtaining second driving characteristic-information of the target road segment based on the second real-time driving data, the topology road segment being an adjacent road segment within a target range of the target road segment; and obtaining road-condition information of the target road segment using a trained road-condition prediction model and based on the first driving characteristic-information and the second driving characteristic-information, and outputting the road-condition information.

According to another aspect of the embodiments of the present disclosure, an apparatus is provided for obtaining road condition information. The apparatus includes a memory storing computer program instructions; and a processor coupled to the memory. When executing the computer program instructions, the processor is configured to perform: obtaining first real-time driving data transmitted by a first vehicle currently passing a target road segment, and obtaining first driving characteristic-information of the target road segment based on the first real-time driving data; obtaining second real-time driving data transmitted by a second vehicle currently passing a topology road segment, and obtaining second driving characteristic-information of the target road segment based on the second real-time driving data, the topology road segment being an adjacent road segment within a target range of the target road segment; and obtaining road-condition information of the target road segment using a trained road-condition prediction model and based on the first driving characteristic-information and the second driving characteristic-information, and outputting the road-condition information.

According to another aspect of the embodiments of the present disclosure, a computer storage medium is provided. The computer storage medium stores computer program instructions executable by at least one processor to perform: obtaining first real-time driving data transmitted by a first vehicle currently passing a target road segment, and obtaining first driving characteristic-information of the target road segment based on the first real-time driving data; obtaining second real-time driving data transmitted by a second vehicle currently passing a topology road segment, and obtaining second driving characteristic-information of the target road segment based on the second real-time driving data, the topology road segment being an adjacent road segment within a target range of the target road segment; and obtaining road-condition information of the target road segment using a trained road-condition prediction model and based on the first driving characteristic-information and the second driving characteristic-information, and outputting the road-condition information.

Other aspects of the present disclosure can be understood by those skilled in the art in light of the description, the claims, and the drawings of the present disclosure.

BRIEF DESCRIPTION OF THE DRAWINGS

To describe the technical solutions in the embodiments of the present disclosure more clearly, the following briefly introduces the accompanying drawings. Apparently, the accompanying drawings in the following description show merely some embodiments of the present disclosure, and a person of ordinary skill in the art may still derive other drawings from the accompanying drawings without creative efforts.

DETAILED DESCRIPTION

A method for obtaining road-condition information provided in the embodiments of the present disclosure may be used for road-condition prediction, and in particular applicable for road-condition prediction of a sparse road segment with less data available. Road-condition information of a target road segment may be obtained through obtaining first driving characteristic-information of a first vehicle currently passing the target road segment and second driving characteristic-information of a second vehicle currently passing a topology road segment adjacent to the target road segment, using a trained road-condition prediction model, and based on the first driving characteristic-information and the second driving characteristic-information, and the road-condition information is outputted. Sparse information filling for the target road segment is achieved based on real-time driving characteristic-information of the target road segment and the topology road segment. This may correct the disadvantage by a conventional model that the road-condition is not inaccurately released when the data is sparse. Thus, the outputted road-condition information is more accurate and credible. In addition, the road-condition information may be quickly obtained based on the road-condition prediction model, resulting in a small calculation amount, covering all road segments, and expanding the area range in which the road-condition information can be released.

The method for obtaining road-condition information can be implemented as a computer program in the embodiments of the present disclosure, and the computer program may run on any computer system. The apparatus for obtaining road-condition information may include a server having functions such as storage, calculation, and testing, and may further include a terminal apparatus such as a tablet computer, a personal computer (PC), a smartphone, a palmtop computer, and a mobile Internet device (MID). The apparatus for obtaining road-condition information may communicate with a first vehicle, a second vehicle, a third vehicle, a fourth vehicle, and a road segment management server in the embodiments of the present disclosure via the Internet, a wireless network, and the like.

Figure 1:
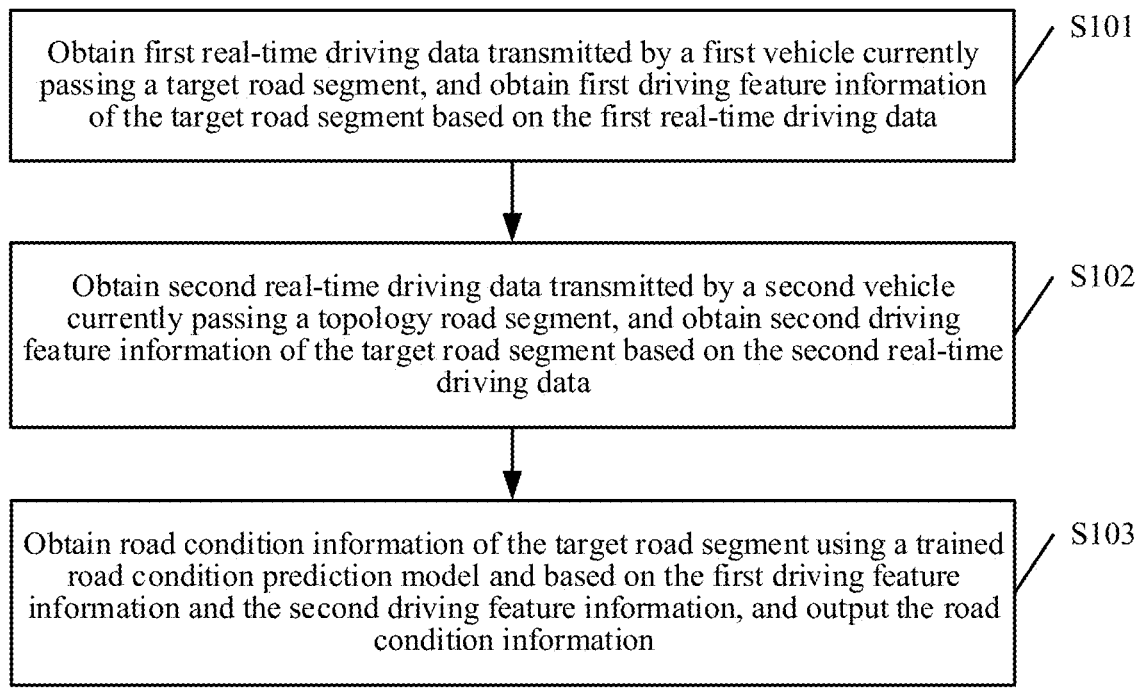
FIG. 1 is a schematic flowchart of a method for obtaining road condition information according to an embodiment of the present disclosure.

FIG. 1 is a schematic flowchart of a method for obtaining road-condition information according to an embodiment of the present disclosure. As shown in FIG. 1, the method in one embodiment of the present disclosure may include the followings.

S101. Obtain first real-time driving data transmitted by a first vehicle currently passing a target road segment, and obtain first driving characteristic-information of the target road segment based on the first real-time driving data.

It can be understood that the apparatus for obtaining road-condition information may collect, using a camera, first driving data of a vehicle passing a target road segment, and parse the currently collected first real-time driving data to extract first driving characteristic-information. The apparatus for obtaining road-condition information may alternatively receive driving data reported by a vehicle-mounted apparatus (for example, a driving recorder) of a first vehicle passing the target road segment or reported by a terminal apparatus (for example, a mobile phone and a tablet computer) associated with the vehicle, and parse the currently received first real-time driving data to extract first driving characteristic-information. The driving data is driving tracking information, and the first real-time driving data reported by the first vehicle may be recorded and reported by the driving recorder. The driving recorder may be a digital electronic record device that records and stores the driving tracking information such as a driving speed, time, mileage of the vehicle and other state information related to vehicle driving, and achieves data output via an interface.

It should be noted that the target road segment may be a busy road segment (e.g., a busily-traveled road segment) or a sparse road segment (e.g., a sparsely-traveled road segment). The implementation scenario of embodiments of the present disclosure is mainly for the sparse road segment.

Specifically, the first driving characteristic-information includes vehicle speed information of the target road segment, the stay duration of the first vehicle on the target road segment, and the number of traffic signal lights on the target road segment. The vehicle speed information of the target road segment may be an average speed or/and a relative speed of the first vehicle currently passing the target road segment.

S102. Obtain second real-time driving data transmitted by a second vehicle currently passing a topology road segment, and obtain second driving characteristic-information of the target road segment based on the second real-time driving data, the topology road segment being an adjacent road segment within a target range of the target road segment.

It can be understood that the apparatus for obtaining road-condition information may collect, using a camera, driving data of a second vehicle passing the topology road segment, and parse the currently collected second real-time driving data to extract second driving characteristic-information. The apparatus for obtaining road-condition information may alternatively receive driving data reported by a vehicle-mounted apparatus (for example, a driving recorder) of a second vehicle passing the topology road segment or reported by a terminal apparatus (for example, a mobile phone and a tablet computer) associated with the vehicle, and parse the currently received second real-time driving data to extract second driving characteristic-information.

Figure 2:
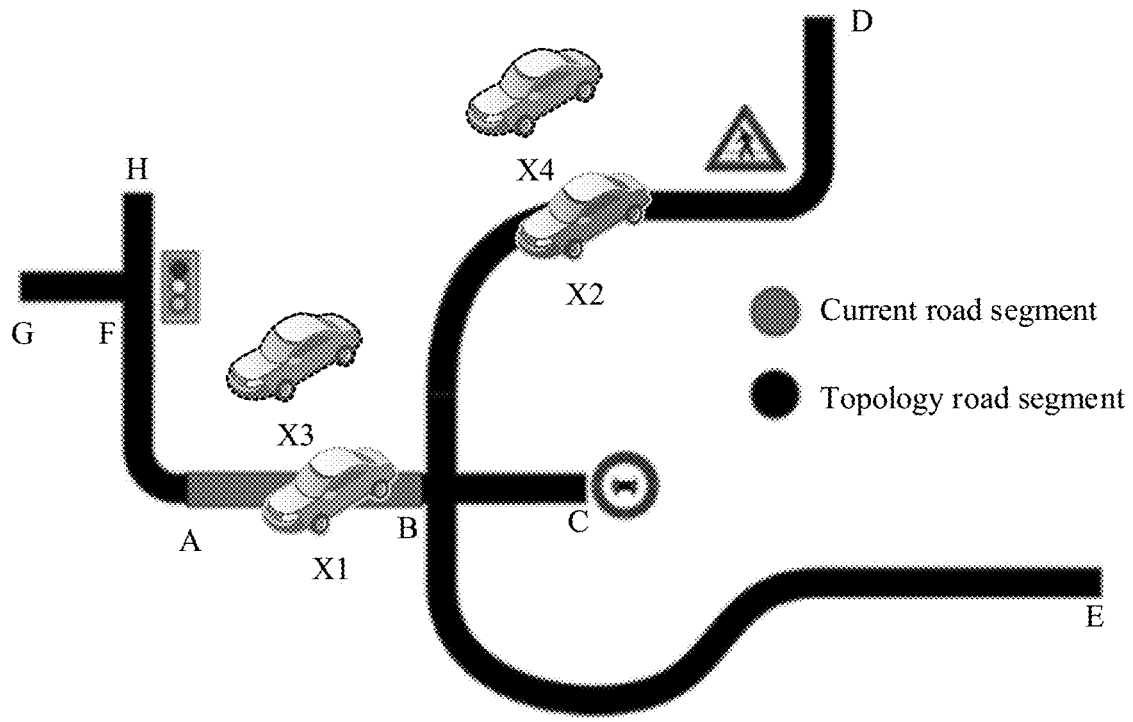
FIG. 2 is a schematic diagram of an interface of a topology network according to an embodiment of the present disclosure.

In a computer network, topology refers to a form in which various sites in the network are connected to each other, the connection structure mainly including a bus topology, a star topology, a ring topology, a tree topology, and a mixed type thereof. In one embodiment of the present disclosure, the topology road segment is a road segment associated with the target road segment and adjacent road segments within the target range of the target road segment, and may also include a plurality of association manners such as a bus topology, a star topology, a ring topology, a tree topology, and a mixed type thereof. As shown in FIG. 2, the gray part (AB) in the figure is the target road segment, and black parts (BC, BD, BE, AF, FH, FG) are topology road segments within a certain range from the target road segment.

Specifically, the second driving characteristic-information includes vehicle speed information of the topology road segment, the stay duration of the second vehicle on the topology road segment, and the number of traffic signal lights on the topology road segment. The vehicle speed information of the topology road segment may be an overall vehicle speed of a vehicle within a certain distance range of upstream and downstream of the topology road segment.

It should be noted that a vehicle passing the target road segment in the current period is the first vehicle, and a vehicle passing the topology road segment is the second vehicle. The first vehicle and the second vehicle may be different vehicles, or may be partially identical vehicles. For example, if the current period is from 17:00 to 18:00 on Sep. 1, 2017, the topology road segment and the target road segment are two directly connected road segments. A traffic route of the vehicle is first passing the topology road segment and then passing the target road segment. The second vehicle may pass the topology segment at 17:10, and the first vehicle passes the target road segment at 17:15. In this case, the first vehicle and the second vehicle are the same vehicle. Alternatively, the second vehicle may pass the topology road segment at 18:00, but the first vehicle passes the target road segment at 18:05, or the second vehicle passes the topology road segment at 16:55, and the first vehicle passes the target road segment at 17:00. In this case, the first vehicle and the second vehicle are different vehicles. There may be not less than one first vehicle and one second vehicle.

In an embodiment, the apparatus for obtaining road-condition information may further obtain first attribute information of the target road segment and second attribute information of the topology road segment using a road segment management server. The first attribute information may include basic attributes of the target road segment, for example, a length of the target road segment, a road grade to which the target road segment belongs (for example, the road grade may be classified into a highway, an urban road, a road, a factory road, a forest road, and a village road, in which the urban road grade is classified into a fast-speed road, an arterial road, a sub-arterial road, and a branch road), a distance from the traffic signal light, a distance from entrances and exits, and the like, and may further include a speed attribute of the target road segment, for example, a free flow speed, a historical classic speed, change status, and the like. The free flow speed refers to a traffic flow running speed that is not affected by upstream and downstream conditions in traffic engineering. The historical classic speed refers to a typical traffic flow speed at this moment in the past few months. The change status refers to a time period in which the road-condition information changes from one state to another state, and a change condition in the speed during the time period.

S103. Obtain road-condition information of the target road segment using a trained road-condition prediction model and based on the first driving characteristic-information and the second driving characteristic-information, and output the road-condition information.

It can be understood that the apparatus for obtaining road-condition information inputs the first driving characteristic-information and the second driving characteristic-information into the trained road-condition prediction model, thereby obtaining road-condition information of the target road segment, outputting and displaying the road-condition, such as performing labeling on the corresponding road segment on a map. The road-condition information of the target road segment may include a clear state, a slowing state, a congested state, and an extremely congested state. When the target road segment is a sparse road, the road-condition information may be generally classified into a clear state, a slowing state, and a congested state. The road-condition prediction model is configured to perform road-condition prediction according to the input information, which may include a clearness model, a congestion model, a slowing model, and the like.

It should be noted that, before using the trained road-condition prediction model to predict the road-condition, the created road-condition prediction model needs to be trained, that is, firstly, historical driving data reported by a third vehicle passing the target road segment in the target period of the historical date is collected using the camera, and the first historical driving data is parsed to extract first historical driving characteristic-information and, secondly, historical driving characteristic-information of a fourth vehicle passing the topology road segment in the target period is obtained in a same manner, and a true road-condition probability value of the target road segment in the target period is obtained based on the first historical driving characteristic-information and the second historical driving characteristic-information, then the first historical driving characteristic-information, the second historical driving characteristic-information, and the true road-condition probability value are used as the inputs of the road-condition prediction model, weight information of the road-condition prediction model is determined using a classification algorithm, and the weight information is substituted into the road-condition prediction model to generate a trained road-condition prediction model. An expression y=ax+b may be similar to the created prediction model, the first historical characteristic-information is the value of x1, the second historical characteristic-information is x2, and the true probability value corresponding to x1 and x2 at the same moment is y, a multi-group x (x1 and x2) and y may be trained to determine values of weights a and b. If a=2 and b=1, then the trained road-condition prediction model is y=2x+1. In an embodiment of the present disclosure, the determined weight information includes attribute information of the target road segment, driving characteristic-information of the target road segment, attribute information of the topology road segment, and driving characteristic-information of the topology road segment.

In an embodiment, the first driving characteristic-information, the second driving characteristic-information, the first attribute information, and the second attribute information are inputted into the trained road-condition prediction model, and the road-condition information of the target road segment is obtained.

Figure 3:
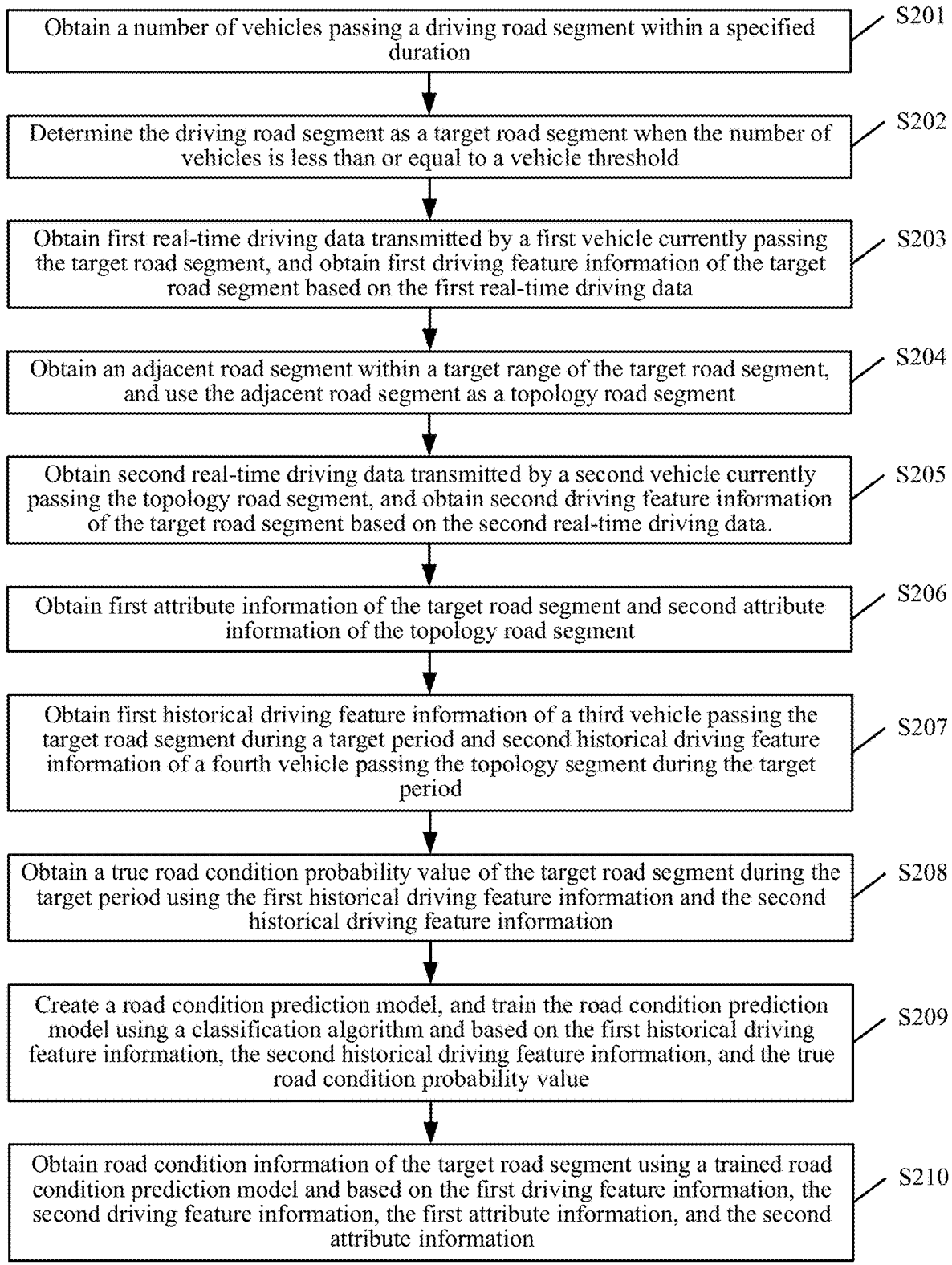
FIG. 3 is a schematic flowchart of another method for obtaining road condition information according to an embodiment of the present disclosure.

FIG. 3 is a schematic flowchart of another method for obtaining road-condition information according to an embodiment of the present disclosure. As shown in FIG. 3, the method in one embodiment of the present disclosure may include the followings.

S201. Obtain a number of vehicles passing a driving road segment within a specified duration.

It can be understood that the apparatus for obtaining road-condition information may monitor driving video information of each driving road segment based on each roadside unit (RSU) to parse the number of vehicles passing each driving road segment within the specified duration.

S202. Determine the driving road segment as a target road segment when the number of vehicles is less than or equal to a vehicle threshold.

It can be understood that the vehicle threshold is a maximum number of vehicles that normally pass the driving road segment within the specified duration. For example, if the specified duration is 10 minutes, the vehicle threshold is 10 vehicles, and three vehicles pass the driving road segment within the specified duration, the road segment is determined as a sparse road segment, and the road segment is determined as the target road segment.

S203. Obtain first real-time driving data transmitted by a first vehicle currently passing the target road segment, and obtain first driving characteristic-information of the target road segment based on the first real-time driving data.

It can be understood that, because there is sufficient data of the target road segment, traffic capacity of the target road segment may be outputted relatively accurately, for example, a traffic speed, a traffic volume, and the number of traffic lights. For the sparse road, there is a small data volume, and the output accuracy of the traffic capacity of the target road segment is insufficient. Therefore, when the target road segment needs to be sparsely filled based on information of a surrounding road segment (the topology road segment) to accurately calculate the road-condition of the target road segment, first the apparatus for obtaining road-condition information parses first real-time driving data reported by a first vehicle currently passing the target road segment, thereby obtaining the first driving characteristic-information.

Figure 4:
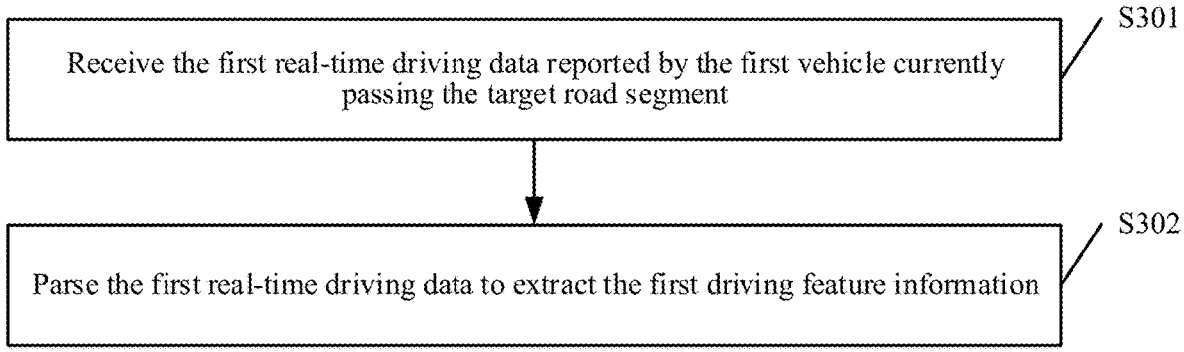
FIG. 4 is a schematic flowchart of another method for obtaining road condition information according to an embodiment of the present disclosure.

In a specific implementation of one embodiment of the present disclosure, the obtaining first real-time driving data transmitted by a first vehicle currently passing a target road segment, and obtaining first driving characteristic-information of the target road segment based on the first real-time driving data may include the followings, as shown in FIG. 4:

S301. Receive first real-time driving data reported by the first vehicle currently passing the target road segment.

S302. Parse the first real-time driving data to extract the first driving characteristic-information.

It can be understood that the apparatus for obtaining road-condition information parses and classifies related information such as the vehicle driving speed, time, mileage, and the like recorded by the driving recorder, extracts some or all of the information based on a specified classification standard, and uses the extracted information as the first driving characteristic-information.

S204. Obtain an adjacent road segment within a target range of the target road segment, and use the adjacent road segment as a topology road segment.

In an implementation, the obtaining the topology road segment may be collecting, by the apparatus for obtaining road-condition information, images of the target road segment and the surrounding road segment using the roadside unit (RSU), extracting the topology road segment in the image based on a specified range condition, or sending a topology segment obtaining request carrying a range condition and a target road segment identifier to a server, so that the server searches and feeds back based on the received information. The manner of obtaining the topology road segment is not specifically limited.

It should be noted that S204 may also be performed after S202, and is not specifically limited.

S205. Obtain second real-time driving data transmitted by a second vehicle currently passing the topology road segment, and obtain second driving characteristic-information of the target road segment based on the second real-time driving data.

It can be understood that the apparatus for obtaining road-condition information parses the first real-time driving data reported by the first vehicle currently passing the target road segment, thereby obtaining the first driving characteristic-information. In FIG. 2, a vehicle currently passing a gray road segment is the first vehicle, and a vehicle currently passing a black road segment is the second vehicle.

Figure 5:
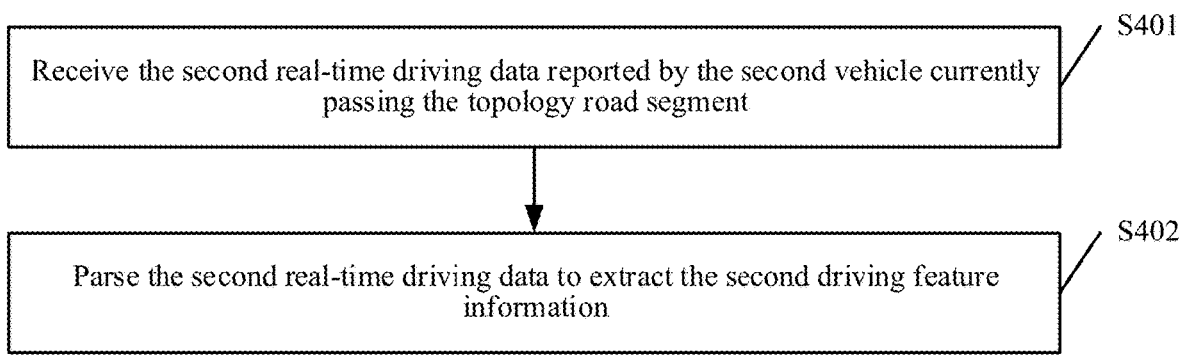
FIG. 5 is a schematic flowchart of another method for obtaining road condition information according to an embodiment of the present disclosure.

In a specific implementation of one embodiment of the present disclosure, the obtaining second real-time driving data transmitted by a second vehicle currently passing a topology road segment, and obtaining second driving characteristic-information of the target road segment based on the second real-time driving data may include the following several steps as shown in FIG. 5:

S401. Receive the second real-time driving data reported by the second vehicle currently passing the topology road segment.

S402. Parse the second real-time driving data to extract the second driving characteristic-information.

It can be understood that the apparatus for obtaining road-condition information parses and classifies related information such as the vehicle driving speed, time, mileage, and the like recorded by the driving recorder, extracts some or all of the information based on a specified classification standard, and uses the extracted information as the second driving characteristic-information.

S206. Obtain first attribute information of the target road segment and second attribute information of the topology road segment.

Figure 6:
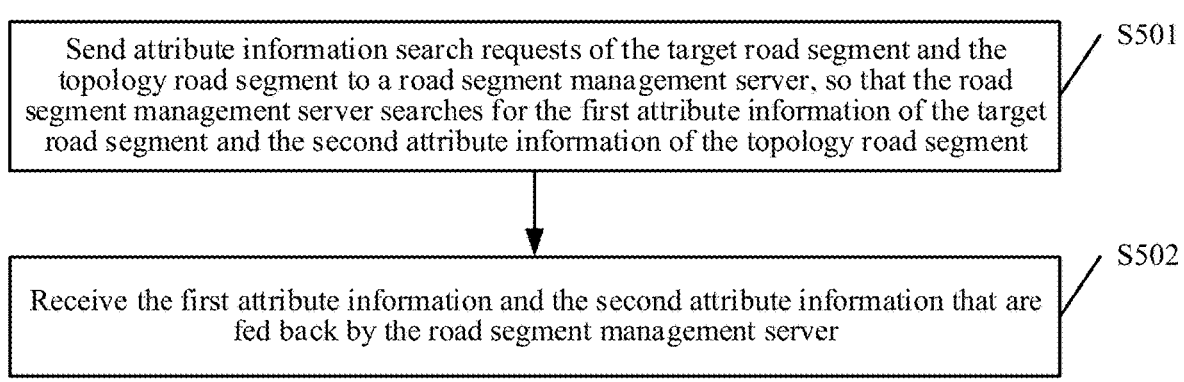
FIG. 6 is a schematic flowchart of another method for obtaining road condition information according to an embodiment of the present disclosure.

In a specific implementation of one embodiment of the present disclosure, the obtaining first attribute information of the target road segment and second attribute information of the topology road segment may include the followings, as shown in FIG. 6.

S501. Send attribute information search requests of the target road segment and the topology road segment to a road segment management server, so that the road segment management server searches for the first attribute information of the target road segment and the second attribute information of the topology road segment.

S502. Receive the first attribute information and the second attribute information that are fed back by the road segment management server.

S207. Obtain first historical driving characteristic-information of a third vehicle passing the target road segment during a target period and second historical driving characteristic-information of a fourth vehicle passing the topology segment during the target period.

It can be understood that the apparatus for obtaining road-condition information parses first historical driving data reported by the third vehicle passing the target road segment in the target period, thereby obtaining first historical driving characteristic-information, and parses second historical driving data reported by the fourth vehicle passing the topology road segment in the target period, thereby obtaining second historical driving characteristic-information.

The first historical driving characteristic-information includes, but is not limited to, historical vehicle speed information of the target road segment, a historical stay duration of the third vehicle on the target road segment, and a number of traffic signal lights on the target road segment. The historical vehicle speed information of the target road segment may be an average speed or/and a relative speed of the third vehicle passing the target road segment on a historical date.

The second historical driving characteristic-information includes, but is not limited to, historical vehicle speed information of the topology road segment, a historical stay duration of the fourth vehicle on the topology road segment, and a number of traffic signal lights on the topology road segment. The historical vehicle speed information of the topology road segment may be an overall vehicle speed of a vehicle within a certain distance range of upstream and downstream of the topology road segment on the historical date.

It can be understood that the target period may be any one or more periods of one day, such as a target period from 17:00 to 18:00. The vehicle passing the target road segment in the target period of the historical date is the third vehicle, and the vehicle passing the topology road segment is the fourth vehicle. The third vehicle and the fourth vehicle may be different vehicles, or may be partially identical vehicles, and there may be not less than one third vehicle and one fourth vehicle. In other words, if the target period is 17:00-18:00, and the current date is Sep. 1, 2017, then a vehicle passing the gray road segment in FIG. 2 from 17:00 to 18:00 on any day (such as Aug. 1, 2017) before Sep. 1, 2017 is the third vehicle, and a vehicle passing the black road segment is the fourth vehicle.

S208. Obtain a true road-condition probability value of the target road segment during the target period using the first historical driving characteristic-information and the second historical driving characteristic-information.

It can be understood that the apparatus for obtaining road-condition information obtains a true road-condition probability value inputted by a road tester based on site surveying results of the target road segment and the topology road segment; or obtains a true road-condition probability value marked by the tester based on offline driving characteristic-information and traffic monitoring video; or matches the first historical driving characteristic-information and the second historical driving characteristic-information with the offline driving characteristic-information to obtain a matching result, and filters non-driving information (non-driving behavior data) in the matching result to generate the true road-condition probability value.

Figure 7:
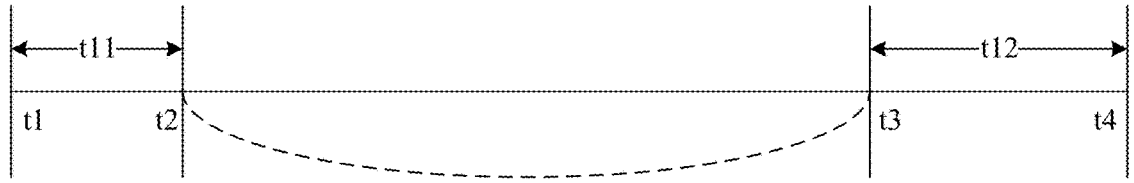
FIG. 7 is a schematic diagram of an interface of an offline track information according to an embodiment of the present disclosure.

Specifically, the offline driving characteristic-information refers to characteristic-information extracted according to a complete offline driving tracking of a target vehicle. As shown in FIG. 7, for the target vehicle, when a time interval between a start moment t2 and a last parking moment t1 is greater than or equal to a first specified time interval t11, the moment t2 is used as a start moment of the offline driving tracking. In addition, when a time interval between a next start moment t3 and a next start moment t4 is greater than or equal to a second specified time interval t12, the moment t3 is used as an end moment of the offline driving tracking, that is, the driving tracking from t2 to t3 is a complete offline driving tracking.

The true road-condition probability value refers to a probability value of the road-condition under an actual road-condition, and the true road-condition probability value is in a one-to-one correspondence with the target period. For example, the true road-condition probability value P=0.8 in the target period 8:00-9:00, and the true road-condition probability value P=0.7 in the target period 12:00-12:30. In addition, the true road-condition probability value is obtained through calculation based on the first historical driving characteristic-information, or the first historical driving characteristic-information, and the second historical driving characteristic-information.

S209. Create a road-condition prediction model, and train the road-condition prediction model using a classification algorithm and based on the first historical driving characteristic-information, the second historical driving characteristic-information, and the true road-condition probability value.

A GBDT is used as an example for description. A basic idea is that first a decision tree is trained with an initial value to obtain a predicted value and a residual after the prediction at a leaf of the decision tree, and then subsequent decision trees are trained based on the residual of the previous decision tree until the residual of the predicted value and the true value is zero. Finally, the predicted value of the test sample is the accumulation of the predicted values of many previous decision trees. For example, it is assumed that there are:

training sets: (A, 14 years old), (B, 16 years old), (C, 24 years old), (D, 26 years old);

an average value of training data: 20 years old;

number of decision trees: 2;

each sample has two features: whether a shopping amount is less than 1K;

whether to frequently search a website for questions or answers.

Figure 8:
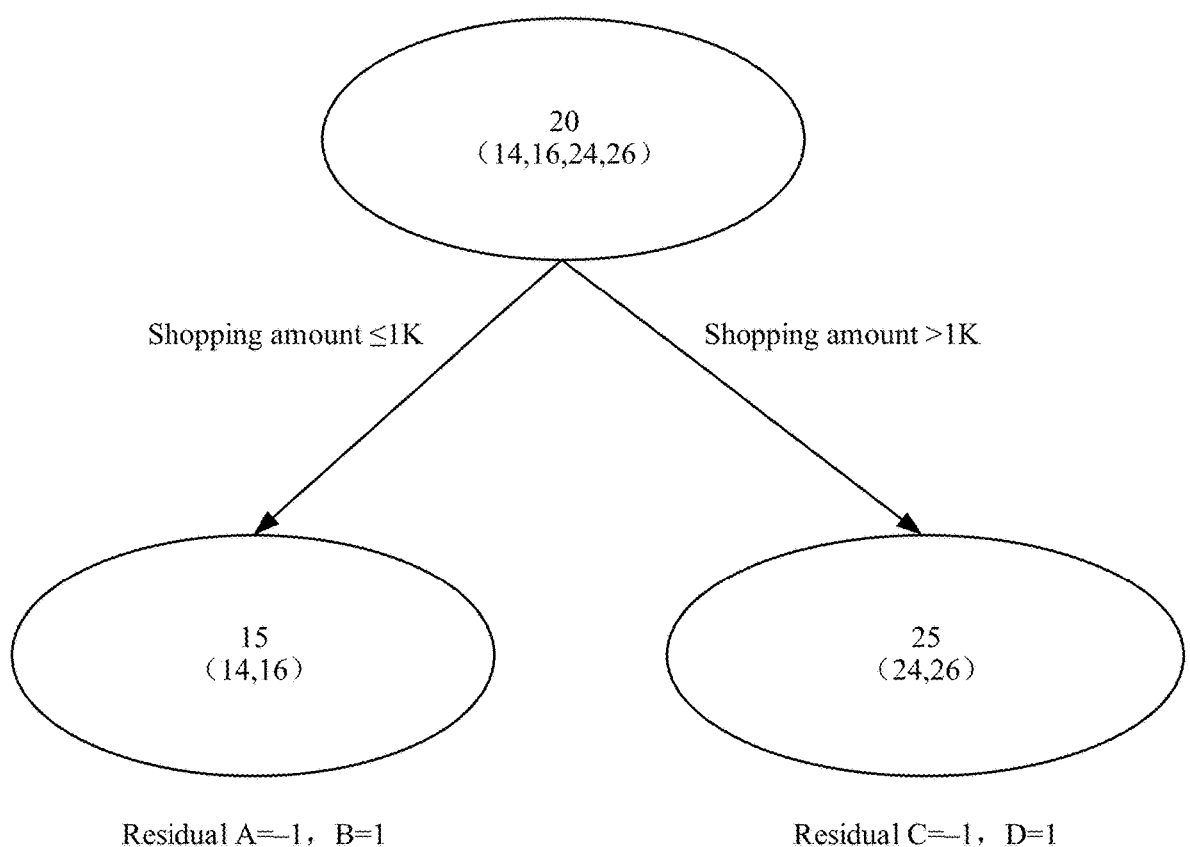
FIG. 8 is a schematic diagram of classification of model training according to an embodiment of the present disclosure.

First, an initial value of 20 years old is inputted, four samples may be divided into two categories according to the first feature, one being the shopping amount ≤1K, and the other being ≥1K. If the training of the first tree is stopped at this time, statistics may be collected about which samples are included in each leaf, what is an average value of these samples, and the mean is distributed to the leaves as a predicted value. For example, if A and B are assigned to the left leaf, and C and D are assigned to the right leaf, then a predicted result is: A and B are 15 years old, and C and D are 25 years old. Residuals appear after the predicted value is compared with an actual age, residuals of A, B, C, and D are −1, 1, −1, 1 respectively. This residual will be used as a training sample of a second decision tree. In this case, a training result is shown in FIG. 8.

Figure 9:
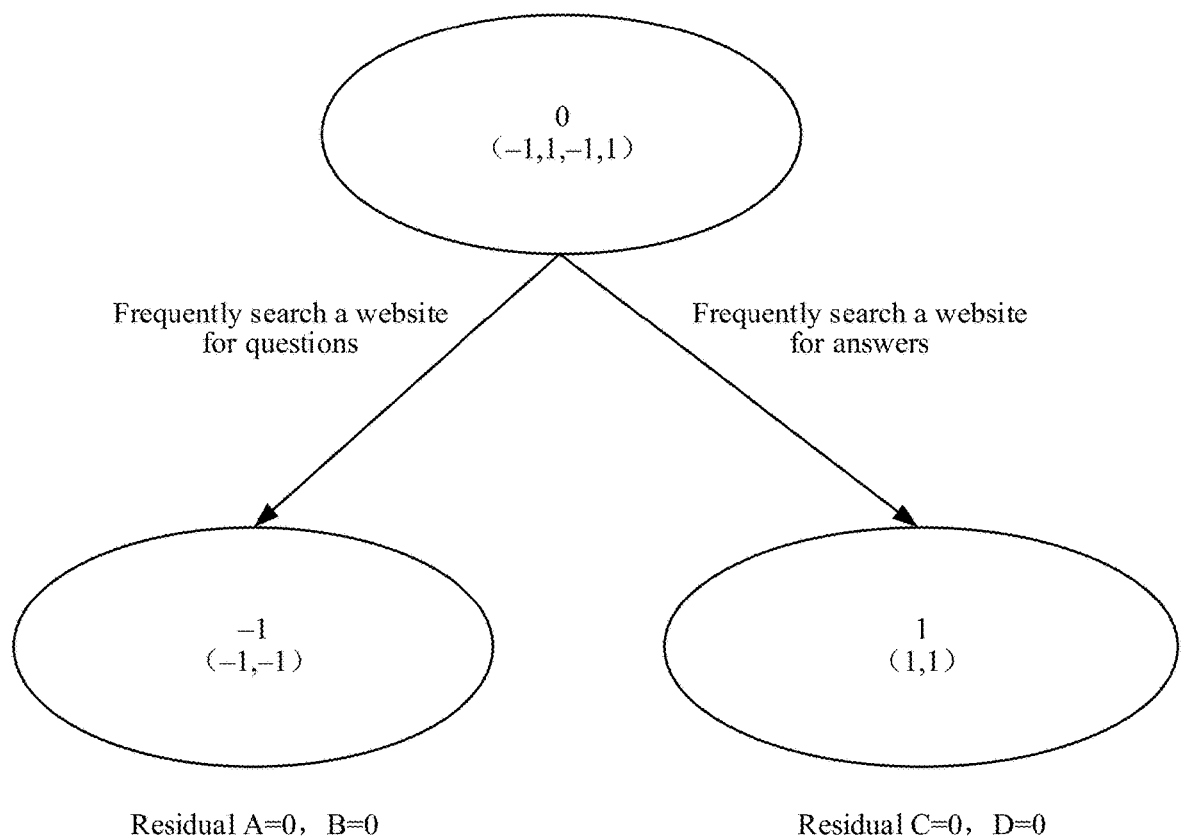
FIG. 9 is a schematic diagram of classification of another model training according to an embodiment of the present disclosure.

Then, the second decision tree is trained, and a residual sample (A, −1 year old), (B, 1 year old), (C, −1 year old), (D, 1 year old) of the first tree are input, and the feature is selected as frequently search the website for questions or answers. In this case, two parts may be obtained again, one part being a left leaf consisting of A and C, and the other part being a right leaf consisting of B and D. It may be learned through calculation that an average value of the left leaf is −1, and an average value of the right leaf is 1. Then the predicted result for the second tree is that A and C are both −1, B and D are both 1. In addition, it may be learned through calculation that residuals of A, B, C, and D are 0, and then training is stopped. In this way, the two decision trees are trained. In this case, a training result is shown in FIG. 9:

In one embodiment of the present disclosure, all training sets may be (historical driving characteristic-information 1, P11), (historical driving characteristic-information 2, P22), (historical driving characteristic-information 3, P33), (historical driving characteristic-information 4, P44); an average value of training data: P0; number of decision trees: 2; each sample has two features: whether a road-condition state is a congested state; and whether the road-condition state is a clear state. The left leaf and the right leaf of the first tree respectively correspond to the congested state and the clear state, and the left leaf and the right leaf of the second tree respectively correspond to the clear state and a slowing state. The two trees are respectively trained in the same manner as described above.

S210. Obtain road-condition information of the target road segment using a trained road-condition prediction model and based on the first driving characteristic-information, the second driving characteristic-information, the first attribute information, and the second attribute information, and output the road-condition information.

It can be understood that the apparatus for obtaining road-condition information inputs the first driving characteristic-information and the second driving characteristic-information into the trained road-condition prediction model respectively to obtain a road-condition probability value corresponding to the target road segment, and compares the road-condition probability value with a probability threshold to determine the road-condition information of the target road segment.

For example, if an inputted test sample is girls with the shopping amount of 3 k and who frequently searches the website for health related questions, a process of predicting the age of the girl based on the foregoing trained model is: based on the condition of the shopping amount as the first tree, it is determined that the girl with the shopping amount greater than 1 k belongs to the right leaf, initially indicating that the girl is 25 years old; then it is determined, according to the condition "frequently search the website for questions" of the second tree, that the girl belongs to the left leaf, indicating that the girl's age residual is −1; and a result 25−1=24 years old is obtained based on each previous tree is, and a final prediction result is 24 years old.

Figure 10:
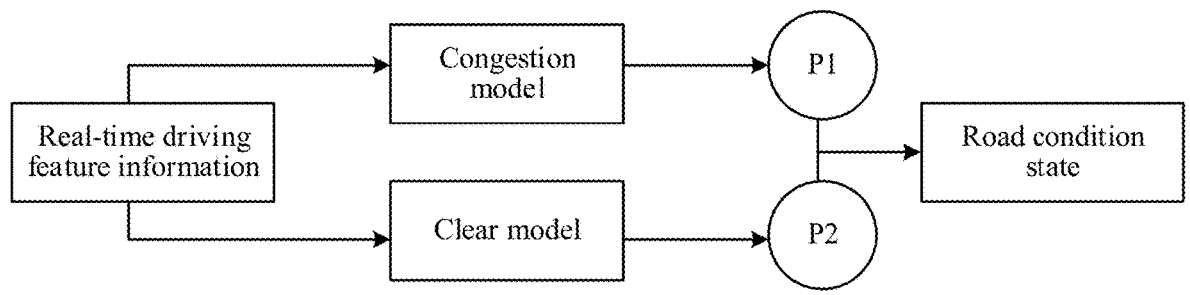
FIG. 10 is a schematic diagram of an indication of an output road condition state of a prediction model according to an embodiment of the present disclosure.

Specifically, the road-condition prediction model includes a clearness prediction model and a congestion prediction model. As shown in FIG. 10, the first driving characteristic-information and the second driving characteristic-information are inputted into the congestion prediction model to obtain a first road-condition probability value P1 corresponding to the congestion prediction model. The first driving characteristic-information and the second driving characteristic-information are inputted into the clearness prediction model to obtain a second road-condition probability value P2 corresponding to the clearness prediction model. The target road segment is first determined to be in a congested state using a determining method in an interval of first being congested, then unblocked, and slowing down when the first road-condition probability value P1 is greater than or equal to a congestion threshold, and the target road segment is determined to be in a clear state when the first road-condition probability value P1 is less than the congestion threshold, and when the second road-condition probability value P2 is greater than or equal to the clearness threshold; when the first road-condition probability value P1 is less than the congestion threshold, and when the second road-condition probability value P2 is less than the clearness threshold, the target road segment is determined to be in a slowing state. Further, the determined road-condition information is outputted and displayed in a map, and a user may drive according to the displayed road-condition information when checking the map through the terminal.

In one embodiment of the present disclosure, the number of vehicles passing the driving road segment within a specified duration is compared with a vehicle threshold, and when the number of vehicles is less than the vehicle threshold, the sparse road segment in the driving road segment is determined, and the sparse road segment is determined as a target segment. First driving characteristic-information of a first vehicle currently passing the target road segment and second driving characteristic-information of a second vehicle currently passing a topology segment adjacent to the target road segment are obtained, then the road-condition information of the target road segment may be obtained using the trained road-condition prediction model and based on the first driving characteristic-information and the second driving characteristic-information, and the road-condition information is output. Sparse information filling for the target road segment is achieved based on real-time driving characteristic-information of the target road segment and the topology road segment, which may correct a disadvantage that the road-condition is not inaccurately released by a conventional model when the data is sparse, so that the outputted road-condition information is more accurate and credible. In addition, the road-condition information may be quickly obtained based on the road-condition prediction model, resulting in a small calculation amount, covering all road segments, and expanding an area range in which the road-condition information can be released.

A system architecture and an implementation scenario of the method for obtaining road-condition information in the embodiments of the present disclosure are described below.

The method for obtaining road-condition information is applied to a navigation scenario. First, the apparatus for obtaining road-condition information sends a first historical driving characteristic-information obtaining request to a vehicle-mounted apparatus of a third vehicle that passes the target road segment in a target period, and the vehicle-mounted apparatus of the third vehicle collects first historical driving data and sends the data to the apparatus for obtaining road-condition information, the apparatus for obtaining road-condition information receiving the first historical driving data and parsing the first historical driving data to extract first historical driving characteristic-information; or the apparatus for obtaining road-condition information receives first historical driving characteristic-information that is sent by the vehicle-mounted apparatus of the third vehicle and obtained through performing collecting and parsing in real time or periodically in the historical target period, and second historical driving characteristic-information of a fourth vehicle passing the topology road segment in the target period may be obtained in a same manner. A true road-condition probability value of the target road segment in the target period is obtained using the first historical driving characteristic-information and the second historical driving characteristic-information; a true road-condition probability value marked by a tester based on offline driving characteristic-information and traffic monitoring video is obtained; the first historical driving characteristic-information and the second historical driving characteristic-information are matched with the offline driving characteristic-information to obtain a matching result, and non-driving information in the matching result is filtered to generate the true road-condition probability value. The apparatus for obtaining road-condition information creates a road-condition prediction model, and trains the road-condition prediction model using a single classification algorithm or using an integrated learning algorithm for combining the single classification algorithm, and based on the first historical driving characteristic-information, the second historical driving characteristic-information, and the true road-condition probability value, thereby generating the trained road-condition prediction model.

A terminal apparatus sends a road-condition obtaining request of the target road segment to the apparatus for obtaining road-condition information, the terminal apparatus being an apparatus that needs to obtain road-condition information of the target road segment.

The apparatus for obtaining road-condition information obtains first real-time driving data transmitted by a vehicle-mounted apparatus of the first vehicle currently passing the target road segment, and obtains first driving characteristic-information of the target road segment based on the first real-time driving data, for example, sends a first real-time driving data obtaining request to the vehicle-mounted apparatus of the first vehicle. The vehicle-mounted apparatus of the first vehicle collects the first real-time driving data and sends the first real-time driving data to the apparatus for obtaining road-condition information, and the apparatus for obtaining road-condition information receives the first real-time driving data and parses the first real-time driving data to extract the first driving characteristic-information; or the vehicle-mounted apparatus of the first vehicle collects first real-time driving data in real time or periodically, parses the first real-time driving data to obtain first driving characteristic-information, and then automatically reports the first driving characteristic-information to the apparatus for obtaining road-condition information; or the apparatus for obtaining road-condition information actively detects the number of vehicles passing the driving road segment within the specified period before receiving the road-condition obtaining request that is of the target road segment and sent by the terminal apparatus, determines that the driving road segment is the target road segment when the number of vehicles is less than or equal to the vehicle threshold, and then obtains first driving characteristic-information of the determined target road segment.

The apparatus for obtaining road-condition information obtains an adjacent road segment within a target range of the target road segment, sets the adjacent road segment as a topology road segment, then obtains second real-time driving data transmitted by a vehicle-mounted apparatus of a second vehicle currently passing the topology road segment, and obtains second driving characteristic-information of the target road segment based on the second real-time driving data, for example, sends a second real-time driving data obtaining request to the vehicle-mounted apparatus of the second vehicle. The vehicle-mounted apparatus of the second vehicle collects second real-time driving data and sends the second real-time driving data to the apparatus for obtaining road-condition information, and the apparatus for obtaining road-condition information receives the second real-time driving data and parses the second real-time driving data to extract second driving characteristic-information; or the vehicle-mounted apparatus of the second vehicle collects second real-time driving data in real time or periodically, parses the second real-time driving data to obtain second driving characteristic-information, and then automatically reports the second driving characteristic-information to the apparatus for obtaining road-condition information.

The apparatus for obtaining road-condition information sends attribute information search requests of the target road segment and the topology road segment to a road-condition management server, the road segment management server searching for first attribute information of the target road segment and second attribute information of the topology road segment and sending the first attribute information and the second attribute information to the apparatus for obtaining road-condition information, and the apparatus for obtaining road-condition information receives the first attribute information and the second attribute information that are fed back by the road segment management server; or the apparatus for obtaining road-condition information searches a local database or a network database for the first attribute information of the target road segment and the second attribute information of the topology road segment.

The apparatus for obtaining road-condition information inputs the first driving characteristic-information, the second driving characteristic-information, the first attribute information, and the second attribute information into a clearness prediction model and a congestion prediction model of the trained road-condition prediction model to obtain a first road-condition probability value corresponding to the congestion prediction model and a second road-condition probability value corresponding to the clearness prediction model. The target road segment is first determined to be in a congested state using an determining method in an interval of first being congested, then unblocked, and slowing down when the first road-condition probability value is greater than or equal to a congestion threshold, and the target road segment is determined to be in a clear state when the first road-condition probability value is less than the congestion threshold, and when the second road-condition probability value is greater than or equal to the clearness threshold; when the first road-condition probability value is less than the congestion threshold, and when the second road-condition probability value is less than the clearness threshold, the target road segment is determined to be in a slowing state. The apparatus for obtaining road-condition information may mark road-condition information of the target road segment on the map by using different colors, fonts, font sizes, and reminder signs, and then send the marked map to the terminal apparatus.

The terminal apparatus directly displays the marked map, or performs labeling on the map after receiving the road-condition information directly returned by the apparatus for obtaining road-condition information; and may output the road-condition information of the target road segment in a manner such as voice broadcast, video play, or dynamic display.

It is assumed that the terminal apparatus M1 wants to query the road-condition information of the AB road segment within a current period (Jan. 2, 2017, 17:00-17:30) in a road segment structure shown in FIG. 2 to keep traffic smooth, the AB road segment and the BD road segment are used as an example, if the third vehicle on the AB road segment in the historical period (Jan. 1, 2017, 17:00-17:30) is X3, and the fourth vehicle on the BD road segment is X4, S1 respectively obtains driving characteristic-information of X3 and X4, and matches the driving characteristic-information of X3 and X4 with the offline driving characteristic-information, thereby calculating a true road-condition probability value P0 of the AB road segment, or obtains the true road-condition probability value P0 of the AB road segment is obtained using a site surveying result of the AB road segment and BD road segment by a survey person, or the off-line driving characteristic-information and the labeling information of the traffic monitoring video are parsed to obtain the true road-condition probability value P0 of the AB road segment. S1 creates a road-condition prediction model, and trains the road-condition prediction model using a classification algorithm and based on the driving characteristic-information of X3 and X4 and P0.

Figure 11:
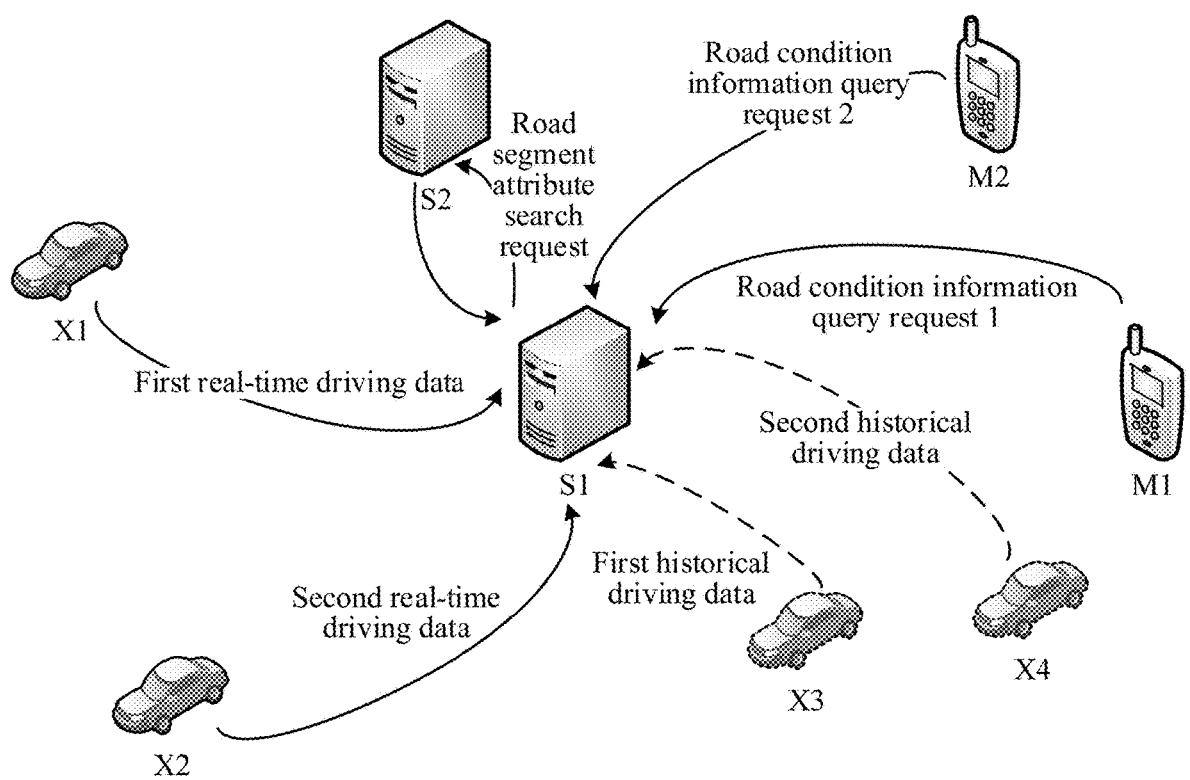
FIG. 11 is a schematic flowchart of a method for obtaining road condition information according to an embodiment of the present disclosure.

If the first vehicle on the AB road segment in the current period is X1, the second vehicle on the BD road segment is X2, and the apparatus for obtaining road-condition information is S1. Referring to FIG. 11, when sending a road-condition query request 1 of the AB road segment to S1 the terminal apparatus M1 triggers X1 and X2 to report respective real-time driving data to S1. S1 parses the real-time driving data after receiving the real-time driving data, and extracts driving characteristic-information such as driving speed information, a stay duration on the road segment, and the number of traffic signal lights on the road segment, and then sends an attribute information search request of the AB road segment and BD road segment to a road segment management server S2, S2 receiving the request, searching for the first attribute information of the AB road segment and the second attribute information of the BD road segment, and then returning the first attribute information and the second attribute information to S1.

S1 inputs the driving characteristic-information and attribute information of the AB road segment and the BD road segment into the congestion prediction model of the trained road-condition prediction model respectively, thereby obtaining a congestion probability value P1 of the AB road segment while inputting the driving characteristic-information of the AB road segment and the BD road segment into the clearness prediction model of the road-condition prediction model respectively, thereby obtaining a clearness probability value P2 of the AB road segment. When P1 is greater than or equal to a congestion threshold PX, the AB road segment is determined to be in a congested state; when P1 is less than PX, and P2 is greater than or equal to the clearness threshold PY, the AB road segment is determined to be in a clear state; and when P1 is less than PX and P2 is less than PY, the AB road segment is determined to be in a slowing state.

S1 returns the determined road-condition state to M1, and M1 directly outputs the received information or marks the received information and then outputs the marked information.

When a plurality of terminal apparatuses M1 and M2 simultaneously send the road-condition query request of the AB road segment to S1, S1 may obtain a query result in the foregoing manner in the order in which the request is received, and then return the query result to M1 and M2.

With reference to FIG. 12 to FIG. 17, the apparatus for obtaining road-condition information provided in the embodiments of the present disclosure is described in detail below. It should be noted that the apparatus for obtaining road-condition information shown in FIG. 12 may be applied to a terminal shown in FIG. 18 for performing the method of the embodiment shown in FIG. 1 to FIG. 11 in the present disclosure. For convenience of description, a part related to one embodiment of the present disclosure is only shown. For specific technical details that are not disclosed, reference may be made to the embodiments shown in FIG. 1 to FIG. 11 of the present disclosure.

Figure 12:
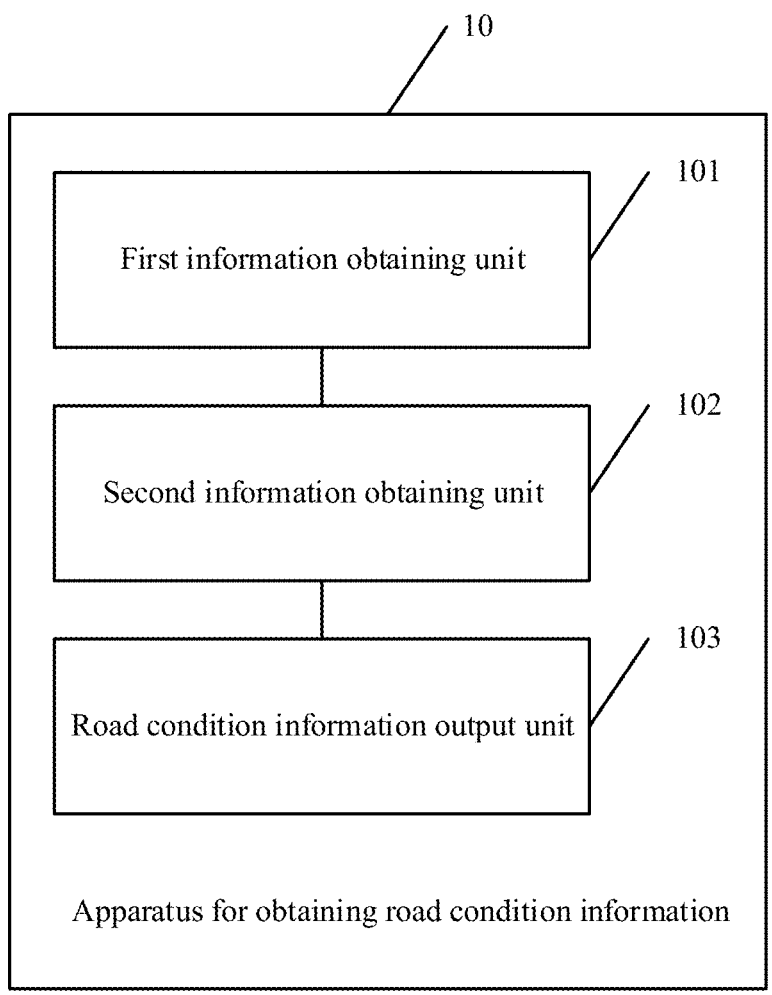
FIG. 12 is a schematic structural diagram of an apparatus for obtaining road condition information according to an embodiment of the present disclosure.

FIG. 12 is a schematic structural diagram of an apparatus for obtaining road-condition information according to an embodiment of the present disclosure. As shown in FIG. 12, the apparatus 10 for obtaining road-condition information of one embodiment of the present disclosure may include: a first information obtaining unit 101, a second information obtaining unit 102, and a road-condition information output unit 103.

The first information obtaining unit 101 is configured to obtain first real-time driving data transmitted by a first vehicle currently passing a target road segment, and obtain first driving characteristic-information of the target road segment based on the first real-time driving data.

It can be understood that the first information obtaining unit may collect, using a camera, first driving data of the first vehicle passing a target road segment, and parse the currently collected first real-time driving data to extract first driving characteristic-information. The first information obtaining unit may alternatively receive driving data reported by a vehicle-mounted apparatus (for example, a driving recorder) of the first vehicle passing the target road segment or reported by a terminal apparatus (for example, a mobile phone and a tablet computer) associated with the vehicle, and parse the currently received first real-time driving data to extract first driving characteristic-information.

It should be noted that the target road segment may be a busy road segment or a sparse road segment. The implementation scenario of one embodiment of the present disclosure is mainly for the sparse road segment.

The second information obtaining unit 102 is configured to obtain second real-time driving data transmitted by a second vehicle currently passing a topology road segment, and obtain second driving characteristic-information of the target road segment based on the second real-time driving data, the topology road segment being an adjacent road segment within a target range of the target road segment.

It can be understood that the second information obtaining unit may collect, using a camera, driving data of a second vehicle passing a topology road segment, and parse the currently collected second real-time driving data to extract second driving characteristic-information. The second information obtaining unit may alternatively receive driving data reported by a vehicle-mounted apparatus (for example, a driving recorder) of the second vehicle passing the topology road segment or reported by a terminal apparatus (for example, a mobile phone and a tablet computer) associated with the vehicle, and parse the currently received second real-time driving data to extract second driving characteristic-information.

It should be noted that the vehicle passing the target road segment in the current period is the first vehicle, and the vehicle passing the topology road segment is the second vehicle. The first vehicle and the second vehicle may be different vehicles, or may be partially identical vehicles. In addition, there may be not less than one first vehicle and one second vehicle.

The road-condition information output unit 103 is configured to obtain road-condition information of the target road segment using a trained road-condition prediction model and based on the first driving characteristic-information and the second driving characteristic-information, and output the road-condition information.

It can be understood that the road-condition information output unit inputs the first driving characteristic-information and the second driving characteristic-information into the trained road-condition prediction model, thereby obtaining road-condition information of the target road segment, outputting and displaying the road-condition, such as performing labeling on the corresponding road segment on a map. The road-condition information of the target road segment may include a clear state, a slowing state, a congested state, and an extremely congested state. When the target road segment is a sparse road, the road-condition information may be generally classified into a clear state, a slowing state, and a congested state. The road-condition prediction model is configured to perform road-condition prediction according to the input information, which may include a clearness model, a congestion model, a slowing model, and the like.

It can be understood that the classification algorithm is used to solve the classification learning problem. A common classification algorithm is classified into a single classification algorithm and an integrated learning algorithm for combining the single classification algorithm, where the single classification algorithm mainly includes: a decision tree (for example, a Gradient Boosting Decision Tree (GBDT)), a Bayesian algorithm, an artificial neural network, K-neighbor, a Support Vector Machine, association rule-based classification, and the like. The integrated learning algorithm for combining the single classification algorithm includes a Bagging algorithm, a Boosting algorithm, and the like.

In an embodiment, the first driving characteristic-information, the second driving characteristic-information, the first attribute information, and the second attribute information are input into the trained road-condition prediction model, and the road-condition information of the target road segment is obtained.

In one embodiment of the present disclosure, the road-condition information of the target road segment may be obtained through obtaining the first driving characteristic-information of the first vehicle currently passing the target road segment and the second driving characteristic-information of the second vehicle currently passing the topology segment adjacent to the target road segment, using a trained road-condition prediction model, and based on the first driving characteristic-information and the second driving characteristic-information, and the road-condition information is output. Sparse information filling for the target road segment is achieved based on real-time driving characteristic-information of the target road segment and the topology road segment, which may correct a disadvantage that the road-condition is not inaccurately released by a conventional model when the data is sparse, so that the output road-condition information is more accurate and credible.

Figure 13:
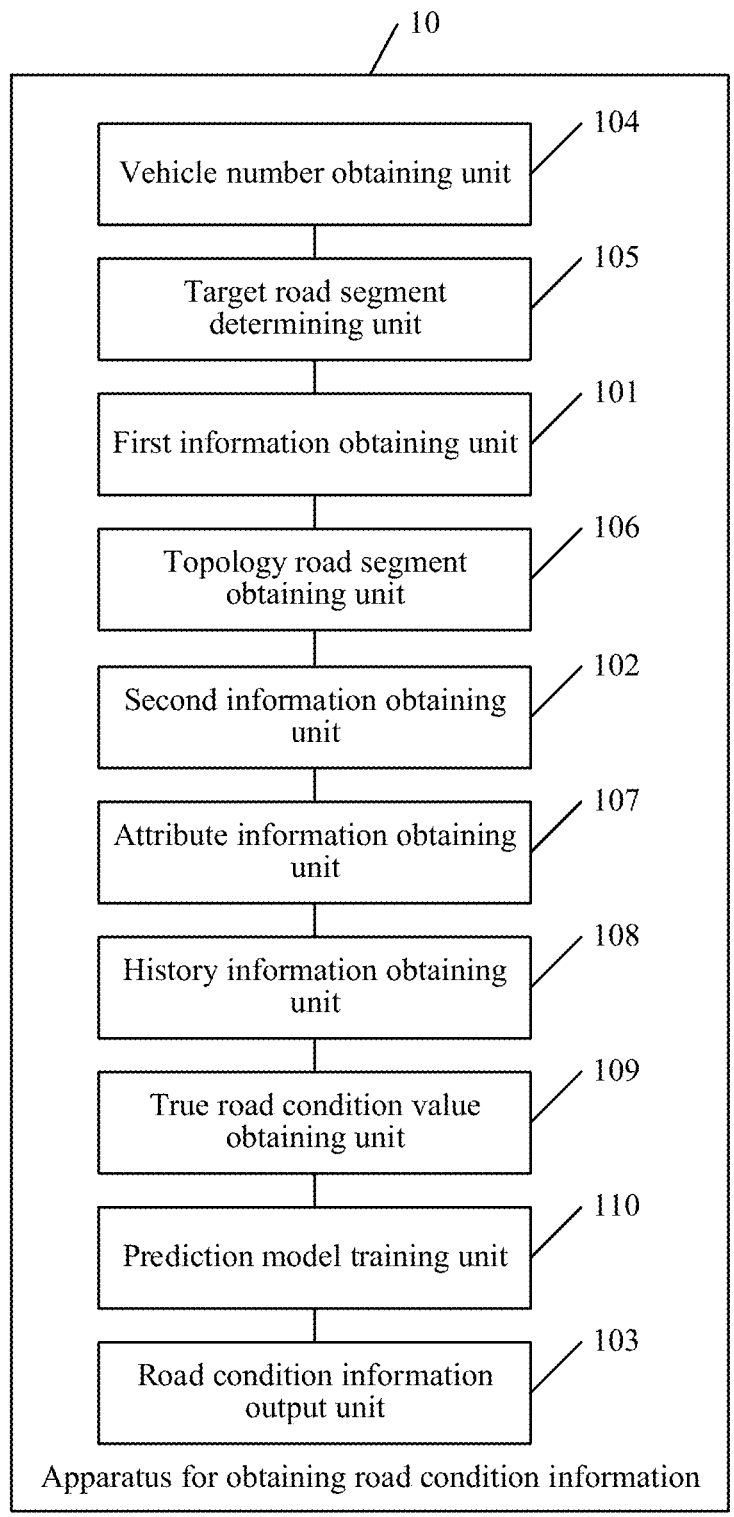
FIG. 13 is a schematic structural diagram of another apparatus for obtaining road condition information according to an embodiment of the present disclosure.

FIG. 13 is a schematic structural diagram of another apparatus for obtaining road-condition information according to an embodiment of the present disclosure. As shown in FIG. 13, an apparatus 10 for obtaining road-condition information of one embodiment of the present disclosure may include: a first information obtaining unit 101, a second information obtaining unit 102, a road-condition information output unit 103, a vehicle number obtaining unit 104, and a target road segment determining unit 105, a topology road segment obtaining unit 106, an attribute information obtaining unit 107, a history information obtaining unit 108, a true road-condition value obtaining unit 109, and a prediction model training unit 110.

The vehicle number obtaining unit 104 is configured to obtain a number of vehicles passing a driving road segment within a specified duration.

It can be understood that the vehicle number obtaining unit 104 may monitor driving video information of each driving road segment based on each roadside unit (RSU) to parse the number of vehicles passing each driving road segment within the specified duration.

The target road segment determining unit 105 is configured to determine that the driving road segment is a target road segment when the number of vehicles is less than or equal to a vehicle threshold.

It can be understood that the vehicle threshold is a maximum number of vehicles that normally pass the driving road segment within the specified duration. For example, if the specified duration is 10 minutes, the vehicle threshold is 10 vehicles, and three vehicles pass the driving road segment within the specified duration, the road segment is determined as a sparse road segment, and the road segment is determined as the target road segment.

The first information obtaining unit 101 is configured to obtain first real-time driving data transmitted by a first vehicle currently passing a target road segment, and obtain first driving characteristic-information of the target road segment based on the first real-time driving data.

Figure 14:
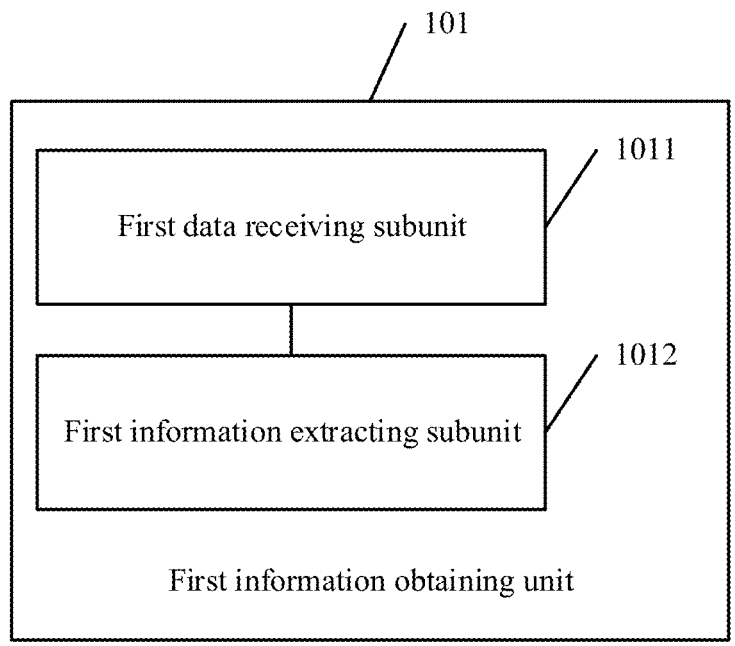
FIG. 14 is a schematic structural diagram of a first information obtaining unit according to an embodiment of the present disclosure.

FIG. 14 is a schematic structural diagram of the first information obtaining unit according to an embodiment of the present disclosure. As shown in FIG. 14, the first information obtaining unit 101 may include a first data receiving subunit 1011 and a first information extracting subunit 1012.

The first data receiving subunit 1011 is configured to receive first real-time driving data reported by a first vehicle currently passing a target road segment.

It can be understood that the first data receiving subunit may receive driving data reported by a vehicle-mounted apparatus (for example, a driving recorder) of the first vehicle passing the target road segment. The driving data is driving tracking information, the first real-time driving data reported by the first vehicle may be recorded and reported by the driving recorder, and the driving recorder records and stores the driving tracking information such as a driving speed, time, mileage of the vehicle and other state information related to vehicle driving, and may achieve a digital electronic record device with data output via an interface.

The first information extracting subunit 1012 is configured to parse the first real-time driving data to extract first driving characteristic-information.

It can be understood that the first information extracting subunit parses and classifies related information such as the vehicle driving speed, time, mileage, and the like recorded by the driving recorder, extracts some or all of the information based on a specified classification standard, and uses the extracted information as the first driving characteristic-information.

The topology road segment obtaining unit 106 is configured to obtain an adjacent road segment within a target range of the target road segment, and use the adjacent road segment as a topology road segment.

In an implementation, the obtaining the topology road segment may be collecting, by the topology road segment obtaining unit 106, images of the target road segment and the surrounding road segment using the roadside unit (RSU), extracting the topology road segment in the image based on a specified range condition, or sending a topology segment obtaining request carrying a range condition and a target road segment identifier to a server, so that the server searches and feeds back based on the received information. The manner of obtaining the topology road segment is not specifically limited.

The second information obtaining unit 102 is configured to obtain second real-time driving data transmitted by a second vehicle currently passing a topology road segment, and obtain second driving characteristic-information of the target road segment based on the second real-time driving data.

It can be understood that the second information obtaining unit 102 parses second real-time driving data reported by a second vehicle currently passing the topology road segment, thereby obtaining the second driving characteristic-information. The topology road segment is an adjacent road segment within the target range of the target road segment. As shown in FIG. 2, the gray portion in the figure is the target road segment, and the black portion is the topology road segment within a certain range from the target road segment. The vehicle passing the target road segment in the current period is the first vehicle, and the vehicle passing the topology road segment in the current period is the second vehicle. The first vehicle and the second vehicle may be different vehicles, or may be partially identical vehicles, and there may be not less than one first vehicle and one second vehicle. In other words, in FIG. 2, a vehicle passing the gray road segment is the first vehicle, and a vehicle passing the black road segment is the second vehicle.

Figure 15:
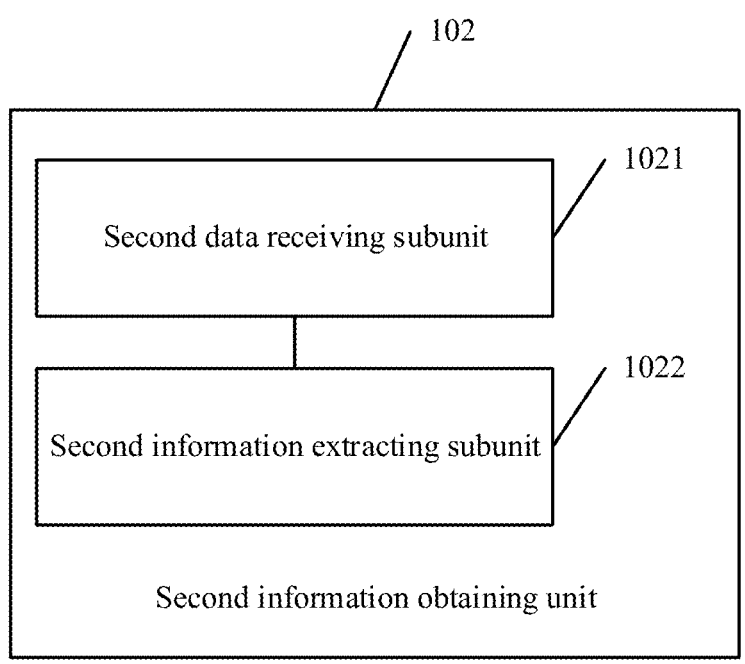
FIG. 15 is a schematic structural diagram of a second information obtaining unit according to an embodiment of the present disclosure.

FIG. 15 is a schematic structural diagram of the second information obtaining unit according to an embodiment of the present disclosure. As shown in FIG. 15, the second information obtaining unit 102 may include a second data receiving subunit 1021 and a second information extracting subunit 1022.

The second data receiving subunit 1021 is configured to receive second real-time driving data reported by a second vehicle currently passing a topology road segment.

It can be understood that the second data receiving subunit may receive driving data reported by a vehicle-mounted apparatus (for example, a driving recorder) of the first vehicle passing the topology road segment. The driving data is driving tracking information, and the second real-time driving data reported by the second vehicle may be recorded and reported by the driving recorder.

The second information extracting subunit 1022 is configured to parse the second real-time driving data to extract second driving characteristic-information.

It can be understood that the second information extracting subunit parses and classifies related information such as the vehicle driving speed, time, mileage, and the like recorded by the driving recorder, extracts some or all of the information based on a specified classification standard, and uses the extracted information as the second driving characteristic-information.

The history information obtaining unit 108 is configured to obtain first historical driving characteristic-information of a third vehicle passing the target road segment during a target period and second historical driving characteristic-information of a fourth vehicle passing the topology segment during the target period.

It can be understood that the history information obtaining unit parses first historical driving data reported by the third vehicle passing the target road segment in the target period, thereby obtaining the first historical driving characteristic-information, and parses second historical driving data reported by the fourth vehicle passing the topology road segment in the target period, thereby obtaining the second historical driving characteristic-information.

The true road-condition value obtaining unit 109 is configured to obtain a true road-condition probability value of the target road segment during the target period using the first historical driving characteristic-information and the second historical driving characteristic-information.

The true road-condition value obtaining unit 109 is specifically configured to: obtain a true road-condition probability value that is input based on site surveying results of the target road segment and the topology road segment; or obtain a true road-condition probability value marked based on offline driving characteristic-information and a traffic monitoring video; or match the first historical driving characteristic-information and the second historical driving characteristic-information with the offline driving characteristic-information to obtain a matching result, and filter non-driving information in the matching result to generate the true road-condition probability value.

The prediction model training unit 110 is configured to create a road-condition prediction model, and train the road-condition prediction model using a classification algorithm and based on the first historical driving characteristic-information, the second historical driving characteristic-information, and the true road-condition probability value.

Figure 16:
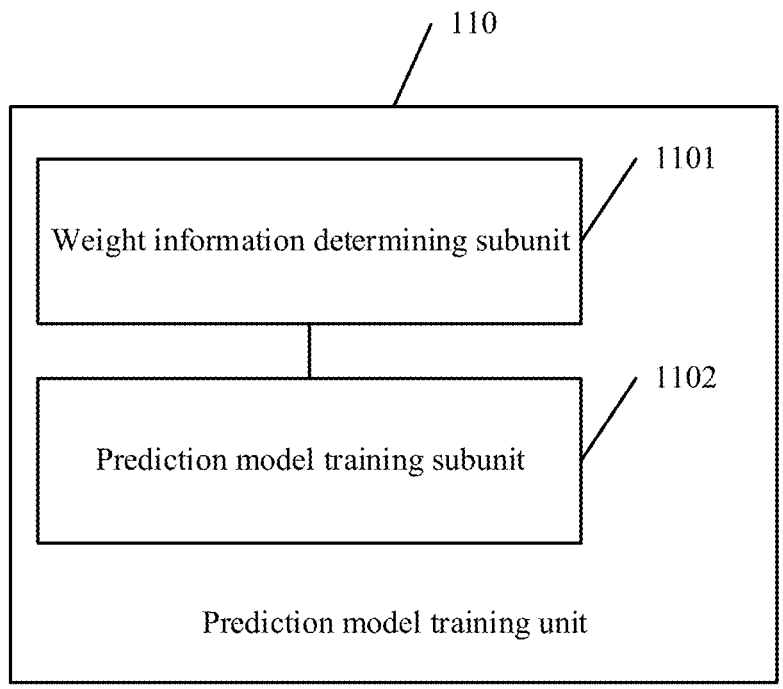
FIG. 16 is a schematic structural diagram of a prediction model training unit according to an embodiment of the present disclosure.

FIG. 16 is a schematic structural diagram of the prediction model training unit according to an embodiment of the present disclosure. As shown in FIG. 16, the prediction model training unit 110 may include a weight information determining subunit 1101 and a prediction model training subunit 1102.

The weight information determining subunit 1101 is configured to create a road-condition prediction model, use the first historical driving characteristic-information, the second historical driving characteristic-information, and the true road-condition probability value as an input of the road-condition prediction model, and determine weight information of the road-condition prediction model using a classification algorithm.

The prediction model training subunit 1102 is configured to substitute the weight information into the road-condition prediction model to generate the trained road-condition prediction model.

The road-condition information output unit 103 is configured to obtain road-condition information of the target road segment using a trained road-condition prediction model and based on the first driving characteristic-information and the second driving characteristic-information, and output the road-condition information.

The road-condition information output unit 103 is specifically configured to: input the first driving characteristic-information and the second driving characteristic-information into the trained road-condition prediction model respectively to obtain a road-condition probability value corresponding to the target road segment, and compare the road-condition probability value with a probability threshold to determine the road-condition information of the target road segment.

The road-condition prediction model includes a clearness prediction model and a congestion prediction model.

The road-condition information output unit 103 is specifically configured to: input the first driving characteristic-information and the second driving characteristic-information into the congestion prediction model to obtain a first road-condition probability value corresponding to the congestion prediction model; input the first driving characteristic-information and the second driving characteristic-information into the clearness prediction model to obtain a second road-condition probability value corresponding to the clearness prediction model; determine that the target road segment is in a congested state when the first road-condition probability value is greater than or equal to a congestion threshold; determine that the target road segment is in a clear state when the first road-condition probability value is less than the congestion threshold and the second road-condition probability value is greater than or equal to a clearness threshold; or determine that the target road segment is in a slowing state when the first road-condition probability value is less than the congestion threshold and the second road-condition probability value is less than the clearness threshold.

It can be understood that the apparatus for obtaining road-condition information inputs the first driving characteristic-information and the second driving characteristic-information into the trained road-condition prediction model respectively to obtain the road-condition probability value corresponding to the target road segment, and compares the road-condition probability value with a probability threshold to determine the road-condition information of the target road segment.

The attribute information obtaining unit 107 is configured to obtain first attribute information of the target road segment and second attribute information of the topology road segment.

It can be understood that the attribute information obtaining unit may further obtain the first attribute information of the target road segment and the second attribute information of the topology road segment using a road segment management server. The road-condition information output unit 103 is specifically configured to: obtain the road-condition information of the target road segment using the trained road-condition prediction model and based on the first driving characteristic-information, the second driving characteristic-information, the first attribute information, and the second attribute information.

Figure 17:
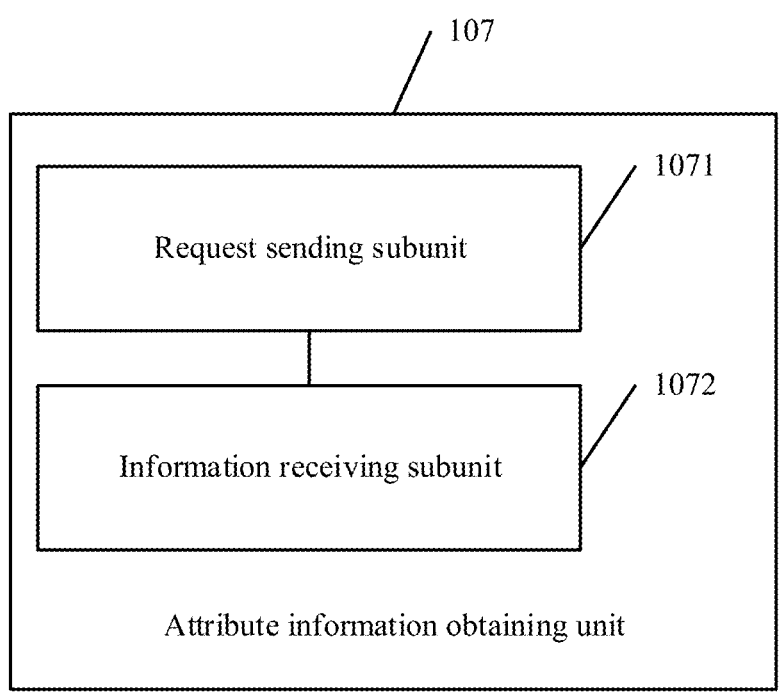
FIG. 17 is a schematic structural diagram of an attribute information obtaining unit according to an embodiment of the present disclosure.

FIG. 17 is a schematic structural diagram of the attribute information obtaining unit according to an embodiment of the present disclosure. As shown in FIG. 17, the attribute information obtaining unit 107 may include a request sending subunit 1071 and an information receiving subunit 1072.

The request sending subunit 1071 is configured to send attribute information search requests of the target road segment and the topology road segment to a road segment management server, so that the road segment management server searches for the first attribute information of the target road segment and the second attribute information of the topology road segment.

The information receiving subunit 1072 is configured to receive the first attribute information and the second attribute information that are fed back by the road segment management server.

The embodiments of the present disclosure further provide a computer storage medium, the computer storage medium storing multiple instructions, and the instructions being adapted to be loaded by a processor and perform the method steps in the embodiments shown in FIG. 1 to FIG. 11. For a specific execution process, refer to the detailed descriptions of the embodiments shown in FIG. 1 to FIG. 11, and details are not described herein again.

Figure 18:
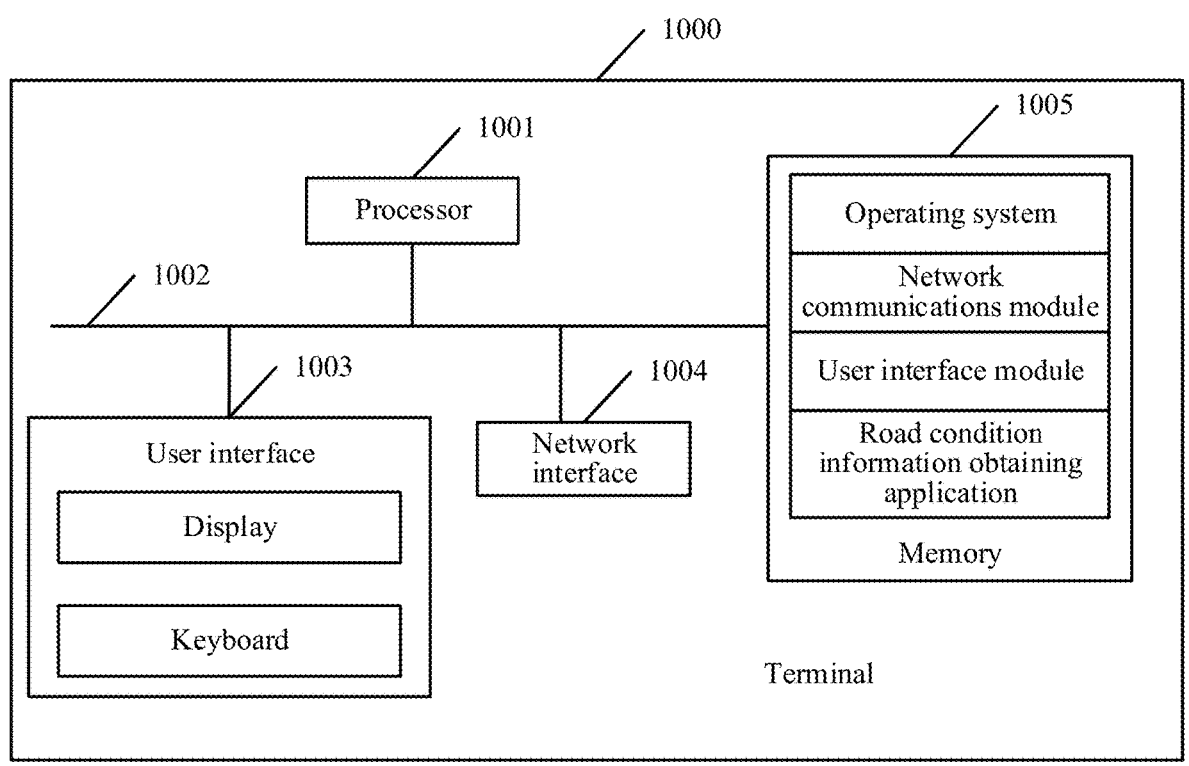
FIG. 18 is a schematic structural diagram of a terminal according to an embodiment of the present disclosure.

FIG. 18 is a schematic structural diagram of a terminal according to an embodiment of the present disclosure. As shown in FIG. 18, the terminal 1000 may include: at least one processor 1001, for example, a CPU, at least one network interface 1004, a user interface 1003, a memory 1005, and at least one communications bus 1002. The communications bus 1002 is configured to implement connections and communication between the components. The user interface 1003 may include a display and a keyboard, and the user interface 1003 may further include a standard wired interface and a standard wireless interface. The network interface 1004 may include a standard wired interface and a standard wireless interface (such as a Wi-Fi interface). The memory 1005 may be a high-speed random-access memory (RAM), or may be a non-volatile memory, for example, at least one magnetic disk memory. Optionally, the memory 1005 may further be at least one storage apparatus that is located far away from the processor 1001, and store an instruction executable by the processor 1001. As shown in FIG. 18, the memory 1005 used as a computer storage medium may include an operating system, a network communications module, a user interface module, and a road-condition information obtaining application program.

In the terminal 1000 shown in FIG. 18, the user interface 1003 is mainly configured to: provide an input interface for a user, and obtain data entered by the user. The network interface 1004 is mainly configured to perform data communication with a user terminal. The processor 1001 may be configured to invoke the instruction stored in the memory 1005, for example, the road-condition information obtaining program, to perform the method for obtaining road-condition information. Details are not described herein again.

A person of ordinary skill in the art may understand that all or some of the processes of the methods in the embodiments may be implemented by a computer program instructing relevant hardware. The program may be stored in a computer readable storage medium. When the program is run, the processes of the embodiments of the foregoing methods may be included. The storage medium may be a magnetic disk, an optical disk, a read-only memory (ROM), a RAM, and the like.

What is claimed is:

1. A method for generating road-condition information by a first server, the method comprising:
obtaining a number of vehicles passing a driving road segment within a duration;
determining whether the driving road segment is a sparse road segment by determining whether the number of vehicles is less than or equal to a vehicle threshold, and
in response to determining the number of vehicles is less than or equal to the vehicle threshold, determining the driving road segment is the sparse road segment and then selecting the driving road segment as a target road segment, and
in response to determining the number of vehicles is greater than the vehicle threshold, determining the driving road segment is not the sparse road segment and then disregarding the driving road segment;
obtaining first real-time driving data transmitted by a first vehicle passing the target road segment, and obtaining first driving characteristic-information of the target road segment based on the first real-time driving data;
obtaining second real-time driving data transmitted by a second vehicle passing a topology road segment, and obtaining second driving characteristic-information of the target road segment based on the second real-time driving data, the topology road segment being a road segment within a target range of the target road segment;

sending an attribute information search request to a second server separate from the first server, the second server including a road segment management server;

receiving, from the second server, attribute information of the topology road segment generated by the road segment management server, wherein the attribute information of the topology road segment generated by the road segment management server includes a length of the topology road segment or a road grade of the topology road segment; and generating road-condition information of the target road segment by inputting at least the second driving characteristic-information of the second vehicle on the topology road segment and the attribute information of the topology road segment to a trained road-condition prediction model, wherein the road-condition prediction model is configured to output a congestion state of the target road segment and is trained by:

obtaining first historical driving characteristic-information of a third vehicle passing the target road segment during a target period and second historical driving characteristic-information of a fourth vehicle passing the topology road segment during the target period;

obtaining a true road-condition probability value of the target road segment during the target period using the first historical driving characteristic-information and the second historical driving characteristic-information, including: matching the first historical driving characteristic-information and the second historical driving characteristic-information with an offline driving characteristic-information to obtain a matching result, and filtering non-driving information in the matching result to generate the true road-condition probability value; and training the road-condition prediction model using a classification algorithm and based on the first historical driving characteristic-information, the second historical driving characteristic-information, and the true road-condition probability value, wherein the road-condition prediction model comprises a congestion prediction model configured to output a first road-condition probability value and a clearness prediction model configured to output a second road-condition probability value, and the congestion state of the target road segment is determined based on the first road-condition probability value and the second road-condition probability value.

2. The method according to claim 1, wherein: the method further comprises:

obtaining attribute information of the target road segment; and the obtaining road-condition information of the target road segment comprises:

obtaining the road-condition information of the target road segment based on the first driving characteristic-information, the second driving characteristic-information, the attribute information of the target road segment, and the attribute information of the topology road segment.

3. The method according to claim 2, further comprising: sending attribute information search requests of the target road segment and the topology road segment to the road segment management server.

4. A first server for obtaining road-condition information, comprising: a memory storing computer program instructions; and a processor coupled to the memory and, when executing the computer program instructions, configured to perform:

obtaining a number of vehicles passing a driving road segment within a duration;

determining whether the driving road segment is a sparse road segment by determining whether the number of vehicles is less than or equal to a vehicle threshold, and in response to determining the number of vehicles is less than or equal to the vehicle threshold, determining the driving road segment is the sparse road segment and then selecting the driving road segment as a target road segment, and in response to determining the number of vehicles is greater than the vehicle threshold, determining the driving road segment is not the sparse road segment and then disregarding the driving road segment;

obtaining first real-time driving data transmitted by a first vehicle passing the target road segment, and obtaining first driving characteristic-information of the target road segment based on the first real-time driving data;

obtaining second real-time driving data transmitted by a second vehicle passing a topology road segment, and obtaining second driving characteristic-information of the target road segment based on the second real-time driving data, the topology road segment being a road segment within a target range of the target road segment;

sending an attribute information search request to a second server separate from the first server, the second server including a road segment management server;

receiving, from the second server, attribute information of the topology road segment generated by the road segment management server wherein the attribute information of the topology road segment generated by the road segment management server includes a length of the topology road segment or a road grade of the topology road segment; and generating road-condition information of the target road segment by inputting at least the second driving characteristic-information of the second vehicle on the topology road segment and the attribute information of the topology road segment to a trained road-condition prediction model, wherein the road-condition prediction model is configured to output a congestion state of the target road segment and is trained by:

obtaining first historical driving characteristic-information of a third vehicle passing the target road segment during a target period and second historical driving characteristic-information of a fourth vehicle passing the topology road segment during the target period;

obtaining a true road-condition probability value of the target road segment during the target period using the first historical driving characteristic-information and the second historical driving characteristic-information, including: matching the first historical driving characteristic-information and the second historical driving characteristic-information with an offline driving characteristic-information to obtain a matching result, and filtering non-driving information in the matching result to generate the true road-condition probability value; and training the road-condition prediction model using a classification algorithm and based on the first historical driving characteristic-information, the second historical driving characteristic-information, and the true road-condition probability value,
wherein the road-condition prediction model comprises a congestion prediction model configured to output a first road-condition probability value and a clearness prediction model configured to output a second road-condition probability value, and the congestion state of the target road segment is determined based on the first road-condition probability value and the second road-condition probability value.

5. The first server according to claim 4, wherein: the processor is further configured to perform:
obtaining attribute information of the target road segment; and the obtaining road-condition information of the target road segment comprises:
obtaining the road-condition information of the target road segment based on the first driving characteristic-information, the second driving characteristic-information, the attribute information of the target road segment, and the attribute information of the topology road segment.

6. The first server according to claim 5, wherein the processor is further configured to perform:
sending attribute information search requests of the target road segment and the topology road segment to the road segment management server.

7. A non-transitory computer-readable storage medium storing computer program instructions executable by at least one processor of a first server to perform:
obtaining a number of vehicles passing a driving road segment within a duration;
determining whether the driving road segment is a sparse road segment by determining whether the number of vehicles is less than or equal to a vehicle threshold, and
in response to determining the number of vehicles is less than or equal to the vehicle threshold, determining the driving road segment is the sparse road segment and then selecting the driving road segment as a target road segment, and
in response to determining the number of vehicles is greater than the vehicle threshold, determining the driving road segment is not the sparse road segment and then disregarding the driving road segment;
obtaining first real-time driving data transmitted by a first vehicle passing the target road segment, and obtaining first driving characteristic-information of the target road segment based on the first real-time driving data;
obtaining second real-time driving data transmitted by a second vehicle passing a topology road segment, and obtaining second driving characteristic-information of the target road segment based on the second real-time driving data, the topology road segment being an adjacent road segment within a target range of the target road segment;
sending an attribute information search request to a second server separate from the first server, the second server including a road segment management server;
receiving, by the first server from the second server, attribute information of the topology road segment generated by the road segment management server, wherein the attribute information of the topology road segment generated by the road segment management server includes a length of the topology road segment or a road grade of the topology road segment; and
generating road-condition information of the target road segment by inputting at least the second driving characteristic-information of the second vehicle on the topology road segment and the attribute information of the topology road segment to a trained road-condition prediction model,
wherein the road-condition prediction model is configured to output a congestion state of the target road segment and is trained by:
obtaining first historical driving characteristic-information of a third vehicle passing the target road segment during a target period and second historical driving characteristic-information of a fourth vehicle passing the topology road segment during the target period;
obtaining a true road-condition probability value of the target road segment during the target period using the first historical driving characteristic-information and the second historical driving characteristic-information, including: matching the first historical driving characteristic-information and the second historical driving characteristic-information with an offline driving characteristic-information to obtain a matching result, and filtering non-driving information in the matching result to generate the true road-condition probability value; and
training the road-condition prediction model using a classification algorithm and based on the first historical driving characteristic-information, the second historical driving characteristic-information, and the true road-condition probability value,
wherein the road-condition prediction model comprises a congestion prediction model configured to output a first road-condition probability value and a clearness prediction model configured to output a second road-condition probability value, and the congestion state of the target road segment is determined based on the first road-condition probability value and the second road-condition probability value.

8. The method according to claim 1, further comprising:
obtaining a true road-condition probability value based on the target road segment and the topology road segment in a target period; and
creating a road-condition prediction model based on the true road-condition probability, wherein the true road-condition probability value is in a one-to-one correspondence with the target period.

9. The method according to claim 1, further comprising:
sending a real-time driving data obtaining request to a vehicle-mounted apparatus of the first vehicle or the second vehicle; and
receiving, from the vehicle-mounted apparatus, the first real-time driving data or the second real-time driving data.

10. The method according to claim 1, wherein the first driving characteristic-information is obtained by:
collecting, using a camera, the first real-time driving data of the first vehicle; and
parsing the first real-time driving data to extract the first driving characteristic-information.

11. The method according to claim 1, wherein the first driving characteristic-information includes a vehicle speed of the first vehicle on the target road segment, a stay duration of the first vehicle on the target road segment, and a number of traffic signal lights on the target road segment.

12. The method according to claim 1, wherein the first vehicle and the second vehicle are the same vehicle.

13. The method according to claim 1, further comprising:
inputting the first driving characteristic-information, the second driving characteristic-information, the first attribute information, and the second attribute information to the road-condition prediction model to obtain the road-condition information of the target road segment.

14. The method according to claim 1, wherein:

the congestion state of the target road segment is determined based on a comparison between the first road-condition probability value and a congestion threshold and a comparison between the second road-condition probability value and a clearness threshold.

15. The method according to claim 1, wherein:

determining that the target road segment to be in a clear state when the first road-condition probability value is less than a congestion threshold, and when the second road-condition probability value is greater than or equal to a clearness threshold;

determining that the target road segment to be in a slowing state when the first road-condition probability value is less than the congestion threshold, and when the second road-condition probability value is less than the clearness threshold; and determining that the target road segment to be in a congested state when the first road-condition probability value is greater than or equal to the congestion threshold.

* * * * *